US012690079B2

(12) United States Patent
Lee et al.

(10) Patent No.: US 12,690,079 B2
(45) Date of Patent: Jul. 21, 2026

(54) DEVICE AND METHOD FOR TRANSMITTING DATA

(71) Applicant: SAMSUNG ELECTRONICS CO., LTD., Suwon-si (KR)

(72) Inventors: Ukho Lee, Suwon-si (KR); Taesik Yun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 743 days.

(21) Appl. No.: 17/958,009

(22) Filed: Sep. 30, 2022

(65) Prior Publication Data
US 2023/0106680 A1 Apr. 6, 2023

Related U.S. Application Data

(63) Continuation of application No. PCT/KR2022/013698, filed on Sep. 14, 2022.

(30) Foreign Application Priority Data

Oct. 1, 2021 (KR) ........................ 10-2021-0130724

(51) Int. Cl.
*H04W 76/15* (2018.01)
*G06F 3/16* (2006.01)
(Continued)

(52) U.S. Cl.
CPC ............. *H04W 76/15* (2018.02); *H04W 4/06* (2013.01); *H04W 24/08* (2013.01); *G06F 3/165* (2013.01);
(Continued)

(58) Field of Classification Search
CPC G06F 3/165; G06F 3/167; H04R 1/10; H04R 1/20; H04W 4/06; H04W 4/80; H04W 24/08; H04W 76/15
See application file for complete search history.

(56) References Cited

U.S. PATENT DOCUMENTS

| 11,405,120 | B2 | 8/2022 | Bonde et al. |
| 2007/0206829 | A1* | 9/2007 | Weinans ............. H04M 1/6066 |
| | | | 381/370 |

(Continued)

FOREIGN PATENT DOCUMENTS

| CN | 109862475 A * | 6/2019 |
| KR | 20140007512 A | 1/2014 |

(Continued)

OTHER PUBLICATIONS

Yang, "Audio Playing Device and Method, A Storage Medium, A Communication Terminal," English Machine Translation of Yang (CN 109862475 A), Clarivate Analytics, pp. 1-15 (Year: 2025).*

(Continued)

*Primary Examiner* — Thomas R Cairns
*Assistant Examiner* — Kai Chang
(74) *Attorney, Agent, or Firm* — CANTOR COLBURN LLP

(57) ABSTRACT

According to various embodiments, an electronic device may comprise a memory, a communication circuit configured to perform communication with at least two external electronic devices through at least two communication links, and at least one processor operatively connected with the memory and the communication circuit. The memory may store instructions configured to, when executed, cause the at least one processor to, transmit first data to each of the at least two external electronic devices through the at least two communication links. The processor further monitors whether second data, which is broadcast data, is received while transmitting the first data. The processor further transmits the second data, instead of the first data, to at least one of the at least two external electronic devices based on a set condition.

20 Claims, 18 Drawing Sheets

(51) Int. Cl.

| | |
|---|---|
| *H04R 1/10* | (2026.01) |
| *H04R 1/20* | (2006.01) |
| *H04W 4/06* | (2009.01) |
| *H04W 24/08* | (2009.01) |

(52) U.S. Cl.
CPC ............... *G06F 3/167* (2013.01); *H04R 1/10* (2013.01); *H04R 1/20* (2013.01)

(56) References Cited

U.S. PATENT DOCUMENTS

| | | | |
|---|---|---|---|
| 2008/0176512 A1* | 7/2008 | Tan ........................ | H04H 60/74 709/201 |
| 2009/0154739 A1 | 6/2009 | Zellner | |
| 2013/0316649 A1* | 11/2013 | Newham .............. | H04W 88/04 455/39 |
| 2016/0360018 A1 | 12/2016 | Watson et al. | |
| 2017/0048613 A1 | 2/2017 | Smus et al. | |
| 2017/0171697 A1 | 6/2017 | Song | |
| 2017/0244576 A1 | 8/2017 | Batra et al. | |
| 2019/0349718 A1 | 11/2019 | Kwon et al. | |
| 2020/0329400 A1* | 10/2020 | Goyal ................... | H04L 5/0055 |
| 2020/0333141 A1 | 10/2020 | Zhu et al. | |
| 2021/0018991 A1 | 1/2021 | Shlomot | |
| 2021/0096811 A1 | 4/2021 | Giles et al. | |
| 2021/0368269 A1* | 11/2021 | Bounamin Sylla ... | H04W 76/10 |
| 2021/0400367 A1* | 12/2021 | Li ............................ | H04R 1/10 |
| 2022/0066734 A1* | 3/2022 | So ............................ | G06F 3/165 |
| 2022/0103607 A1* | 3/2022 | Young ..................... | G06F 3/167 |
| 2022/0210541 A1* | 6/2022 | Wang ................... | H04R 1/1025 |
| 2022/0240018 A1* | 7/2022 | Hsieh ....................... | H04R 5/04 |
| 2023/0069230 A1* | 3/2023 | Girardier ............. | H04R 1/1041 |
| 2024/0394011 A1* | 11/2024 | Chen ....................... | H04W 4/80 |

FOREIGN PATENT DOCUMENTS

| | | |
|---|---|---|
| KR | 101819822 B1 | 1/2018 |
| KR | 20210036841 A | 4/2021 |
| WO | 20210161096 A1 | 8/2021 |

OTHER PUBLICATIONS

International Search Report with English Translation and Written Opinion for International Application No. PCT/KR2022/013698; International Filing Date Sep. 14, 2022; Date of Mailing Dec. 23, 2022; 9 pages.

Korean Office Action for Korean Application No. 10-2021-0130724; Report Mail Date Feb. 26, 2026 (12 Pages—with English translation).

* cited by examiner

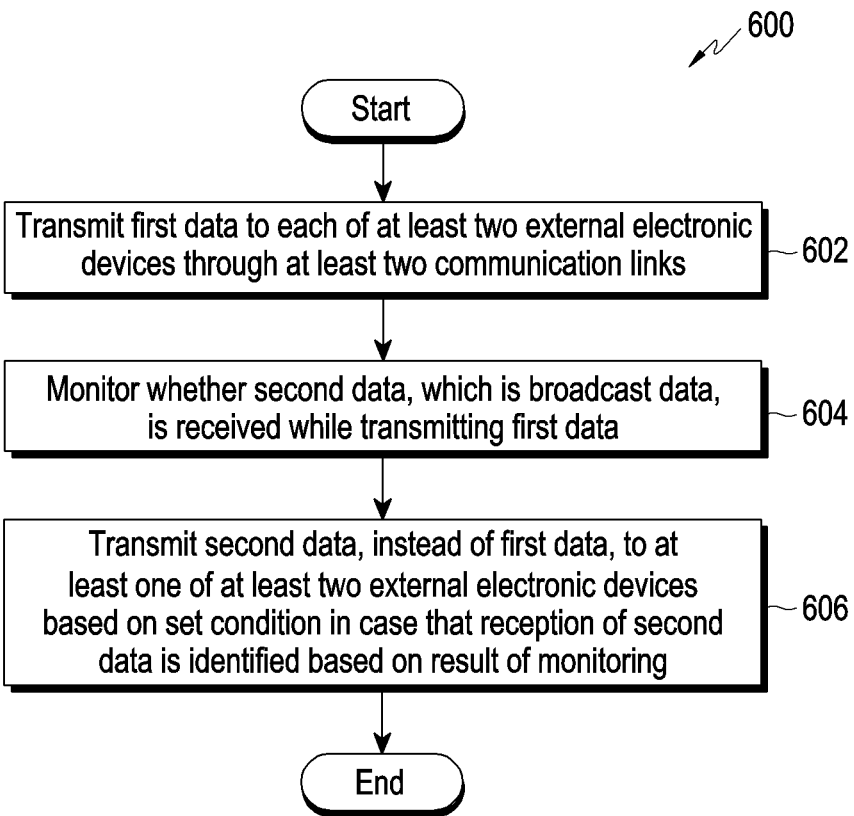

/600

Start

Transmit first data to each of at least two external electronic devices through at least two communication links ~602

Monitor whether second data, which is broadcast data, is received while transmitting first data ~604

Transmit second data, instead of first data, to at least one of at least two external electronic devices based on set condition in case that reception of second data is identified based on result of monitoring ~606

End

FIG. 6

DEVICE AND METHOD FOR TRANSMITTING DATA

CROSS-REFERENCE TO RELATED APPLICATION(S)

This application is a PCT-Bypass Continuation of International Patent Application No. PCT/KR2022/013698, filed on Sep. 14, 2022, which claims priority to Korean Patent Application No. 10-2021-0130724, filed on Oct. 1, 2021, and all the benefits accruing therefrom under 35 U.S.C. § 119, the contents of which are hereby incorporated by reference for all purposes as if fully set forth herein.

TECHNICAL FIELD

Various embodiments relate to a device and method for transmitting data.

BACKGROUND ART

Bluetooth™ communication technology provides a short-range wireless communication technology that enables electronic devices to be connected to each other for exchanging data or information. Bluetooth communication technology may have Bluetooth legacy (or classic) communication technology or Bluetooth low energy (BLE) communication technology and have various kinds of topology, such as piconet or scatternet.

Presently, electronic devices adopting Bluetooth™ communication technology are in wide use. For example, a pair of earphones that may be respectively worn on both ears of the user are widely used as an ear-wearable device.

The ear-wearable device may perform data communication with an electronic device, such as a smart phone, through Bluetooth communication technology. For example, the ear-wearable device may receive audio data from the electronic device through Bluetooth communication and may output the received audio data through the speaker of the ear-wearable device.

DISCLOSURE

Technical Problem

An electronic device, such as a smart phone, may establish a communication link with each of a pair of earphones, e.g., a left earbud device and a right earbud device. The pair of earphones may be included in an ear-wearable device. In an example, the electronic device may establish a first communication link with the left earbud device and may establish a second communication link with the right earbud device.

Data transport streams included in the same group may be used through the first communication link and the second communication link. The same data may be transmitted through data transport streams included in the same group. For example, the electronic device may transmit the same audio data to the left earbud device and the right earbud device through data transport streams included in the same group in the first communication link and the second communication link.

Different data may not be transmitted through data transport streams included in the same group. Accordingly, the left earbud device and the right earbud device have no choice but to receive the same data from the electronic device, and thus, the user is inevitably provided with a service using the same data through the left earbud device and the right earbud device.

According to various embodiments, the electronic device may provide a first service to at least one of external electronic devices (e.g., the left earbud device and the right earbud device) and may provide the first service and/or a second service different from the first service to at least one other of the external electronic devices.

Technical Solution

According to various embodiments, an electronic device may comprise a memory, a communication circuit configured to perform communication with at least two external electronic devices through at least two communication links, and at least one processor operatively connected with the memory and the communication circuit. The memory may store instructions configured to, when executed, cause the at least one processor to, transmit first data to each of the at least two external electronic devices through the at least two communication links, monitor whether second data, which is broadcast data, is received while transmitting the first data, and transmit the second data, instead of the first data, to at least one of the at least two external electronic devices based on a set condition in case that reception of the second data is identified based on a result of the monitoring.

According to various embodiments, a method for transmitting data by an electronic device may comprise transmitting first data to each of at least two external electronic devices through at least two communication links. The method may further comprise transmitting whether second data, which is broadcast data, is received while transmitting the first data, and transmitting the second data, instead of the first data, to at least one of the at least two external electronic devices based on a set condition in case that reception of the second data is identified based on a result of the monitoring.

Advantageous Effects

In various embodiments, the electronic device may transmit different data to each of at least two external electronic devices, so that the user may use a first service (e.g., audio streaming service) with at least one external electronic device while simultaneously using a second service (e.g., announcement service) with at least one other external electronic device.

According to various embodiments, the electronic device may overlap and transmit different data to at least one of at least two external electronic devices, thereby allowing the user to simultaneously use data for two services. For example, the user may listen to the announcement while listening to music based on audio data.

According to various embodiments, the electronic device may transmit broadcast data to at least one of at least two external electronic devices while transmitting dedicated data, such as audio data, to the at least two external electronic devices.

According to various embodiments, the electronic device may perform data transmission based on the user's selection. For example, the electronic device may transmit data on a broadcast channel selected by the user to at least one external electronic device selected by the user from among at least two external electronic devices.

3

Figure 2:
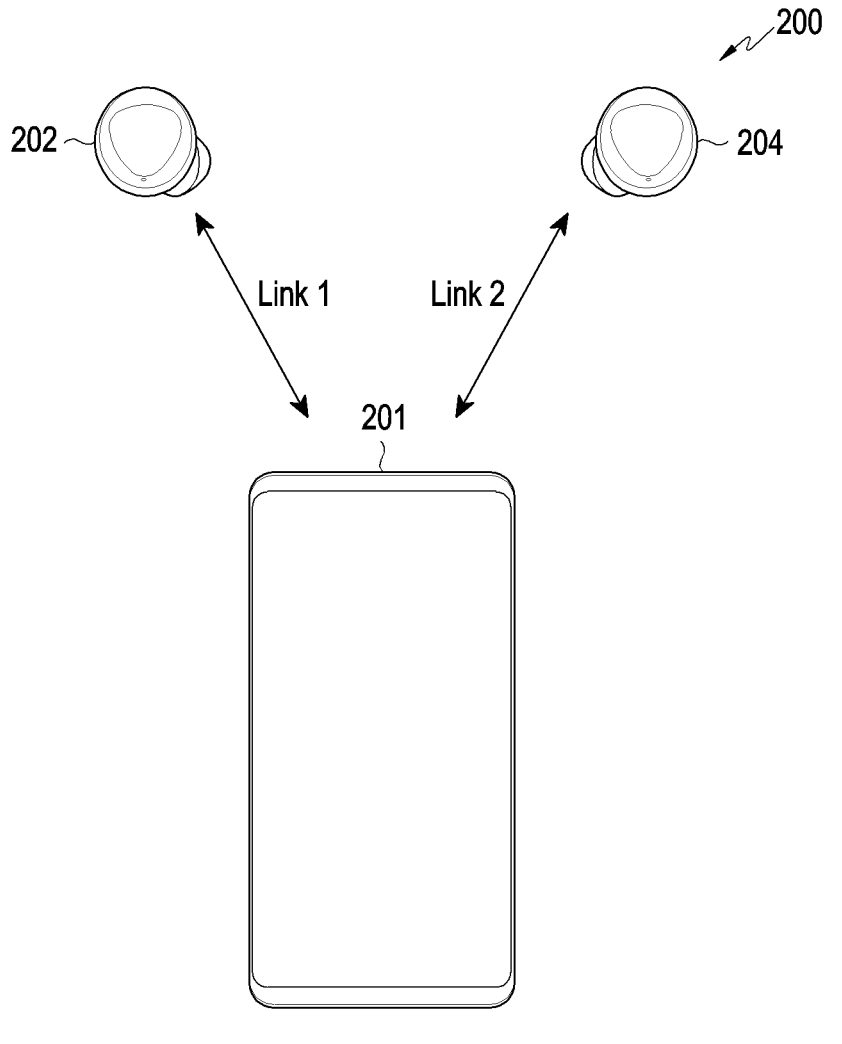
Figure 3A:
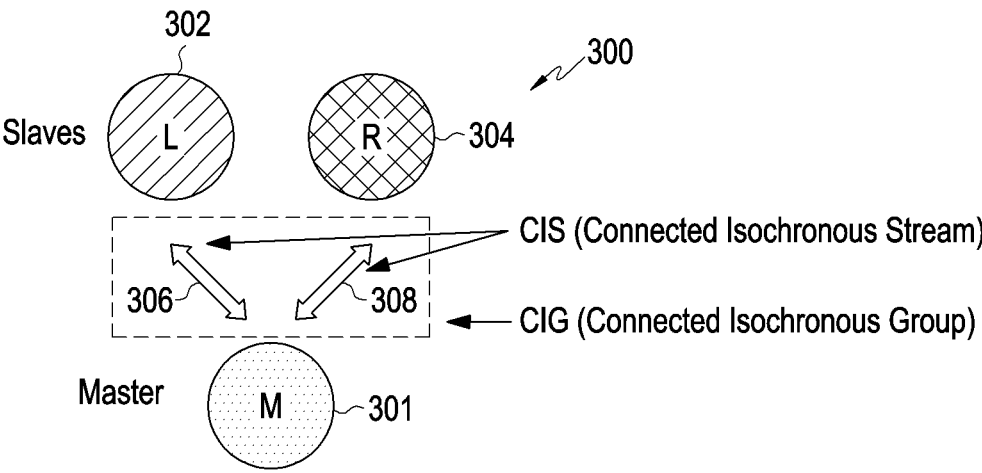
Figure 3B:
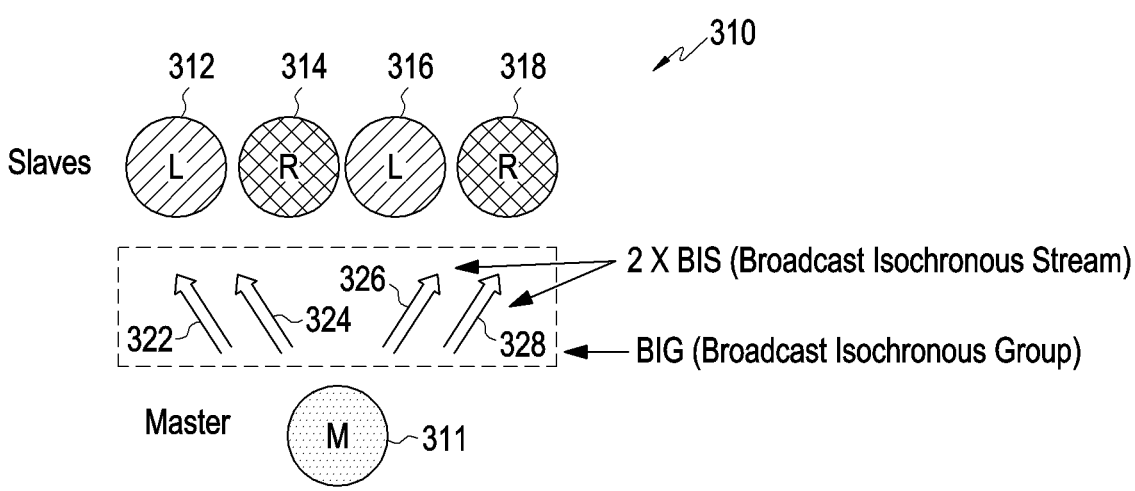
Figure 4:
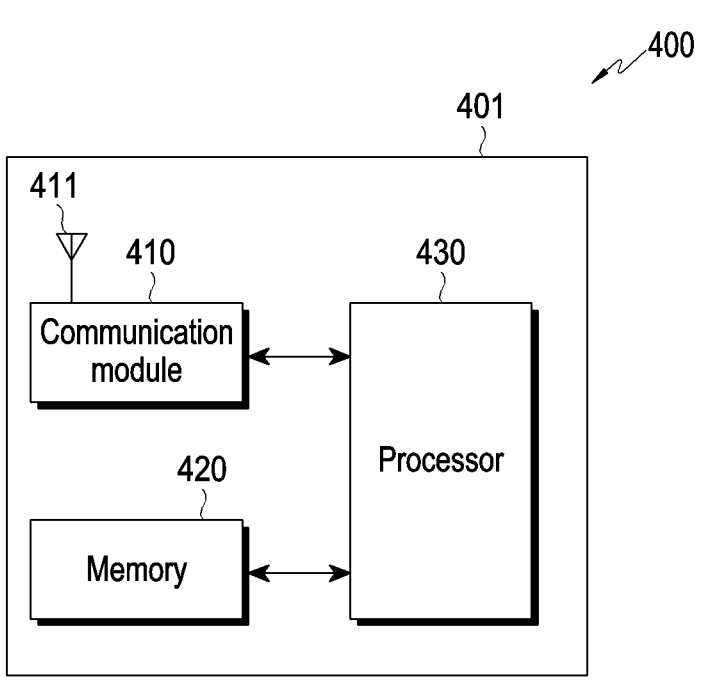
Figure 5:
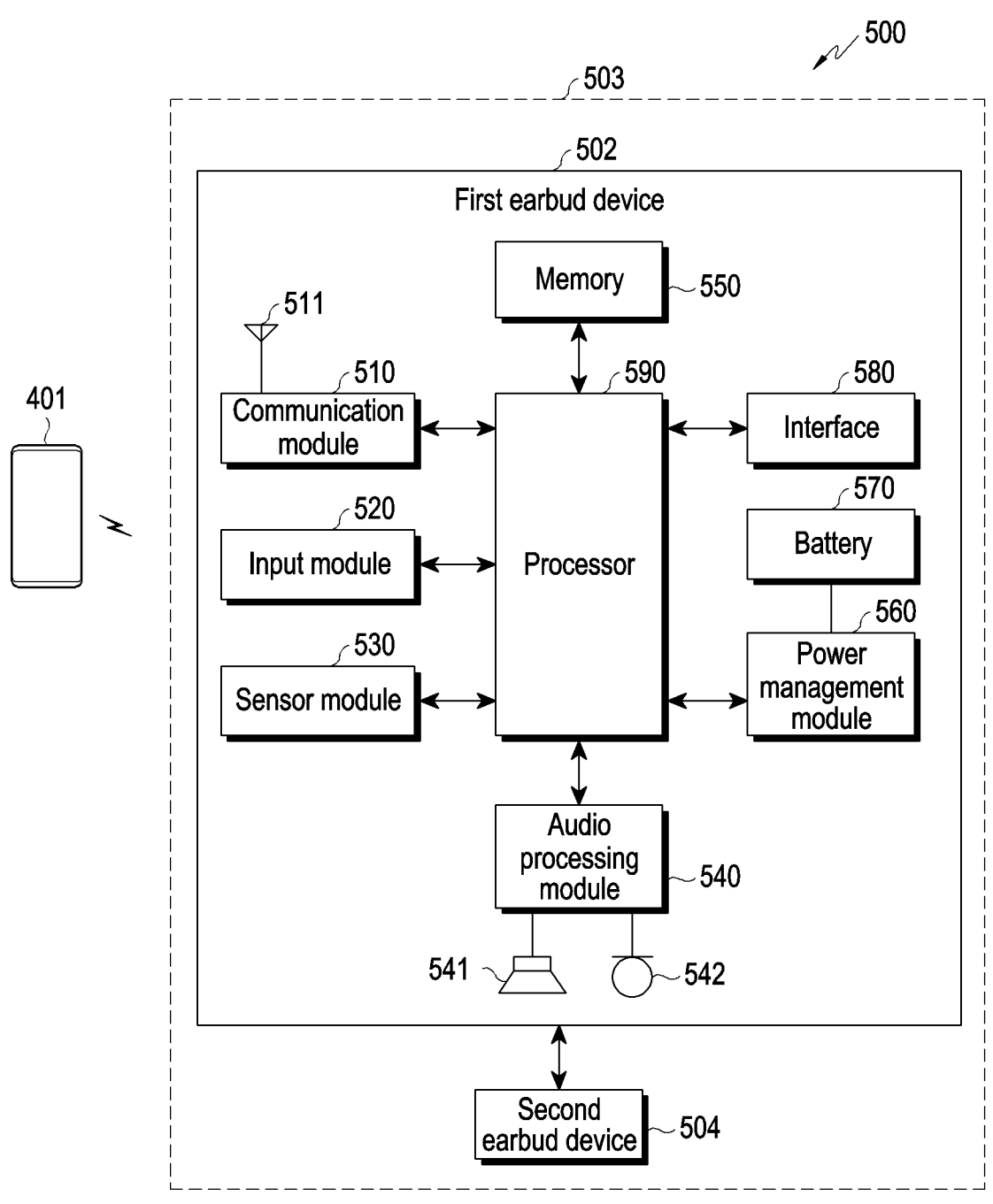
Figure 7:
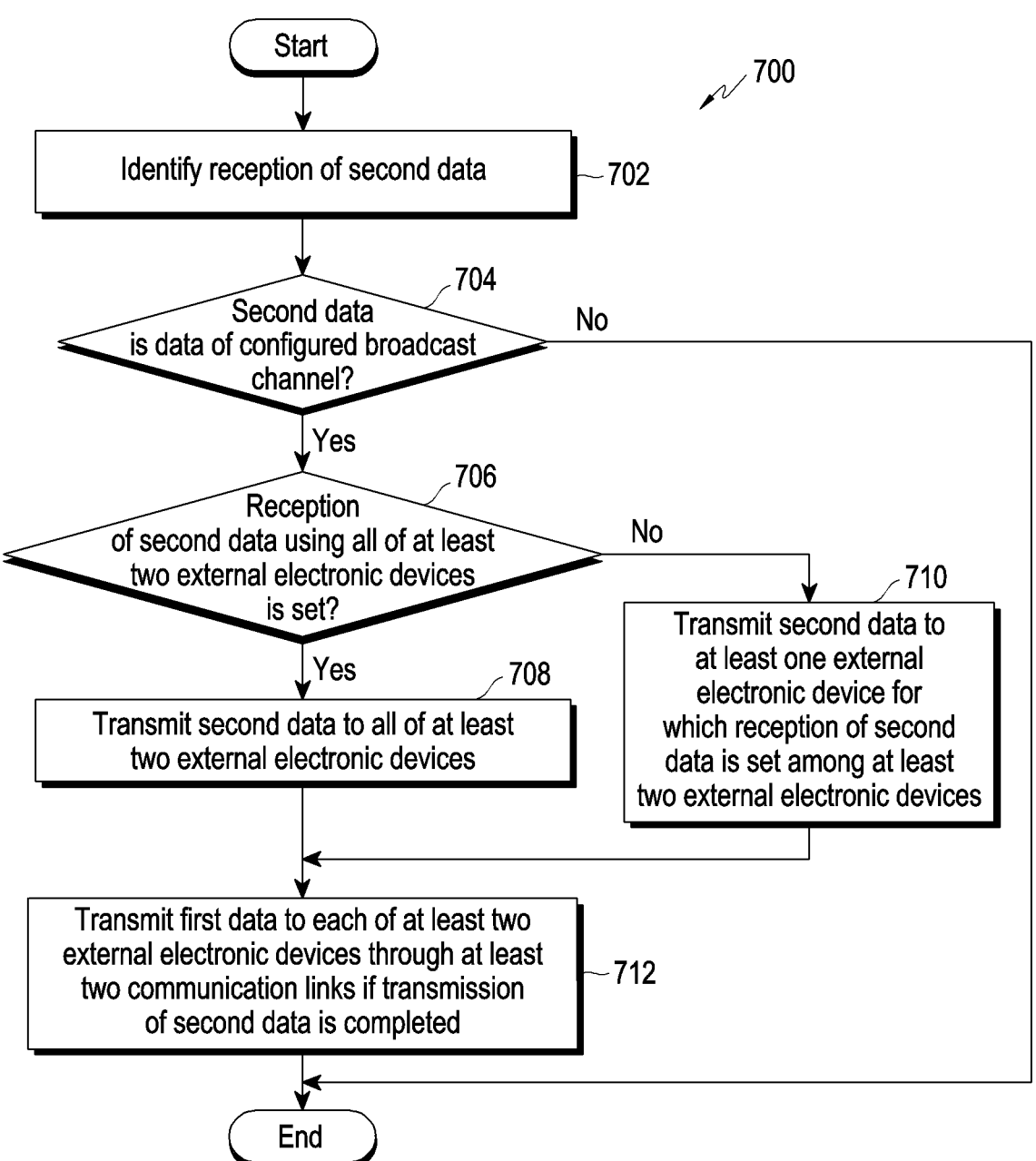
Figure 8:
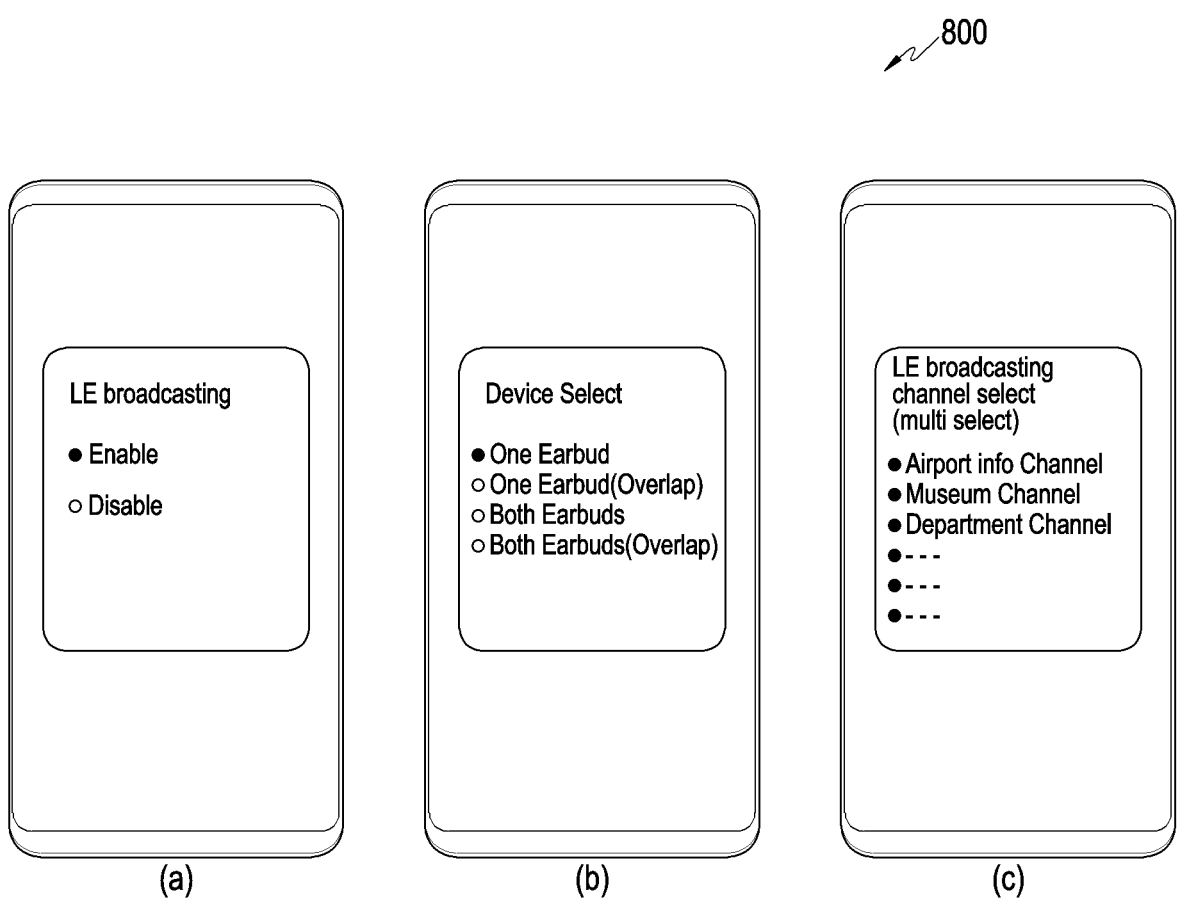
Figure 9:
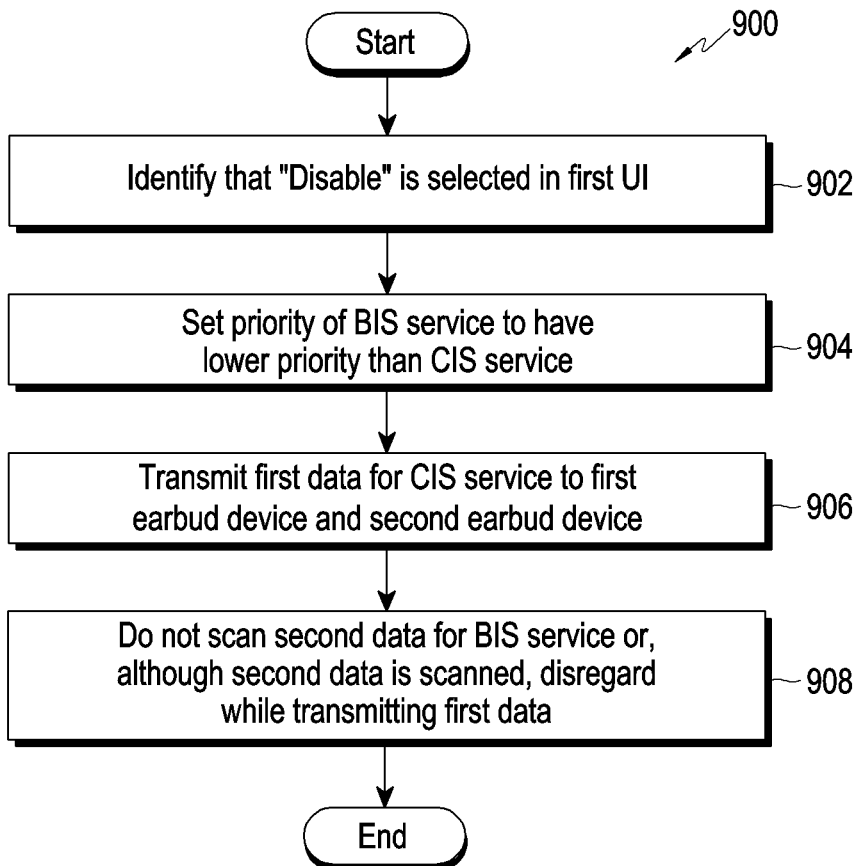
Figure 10:
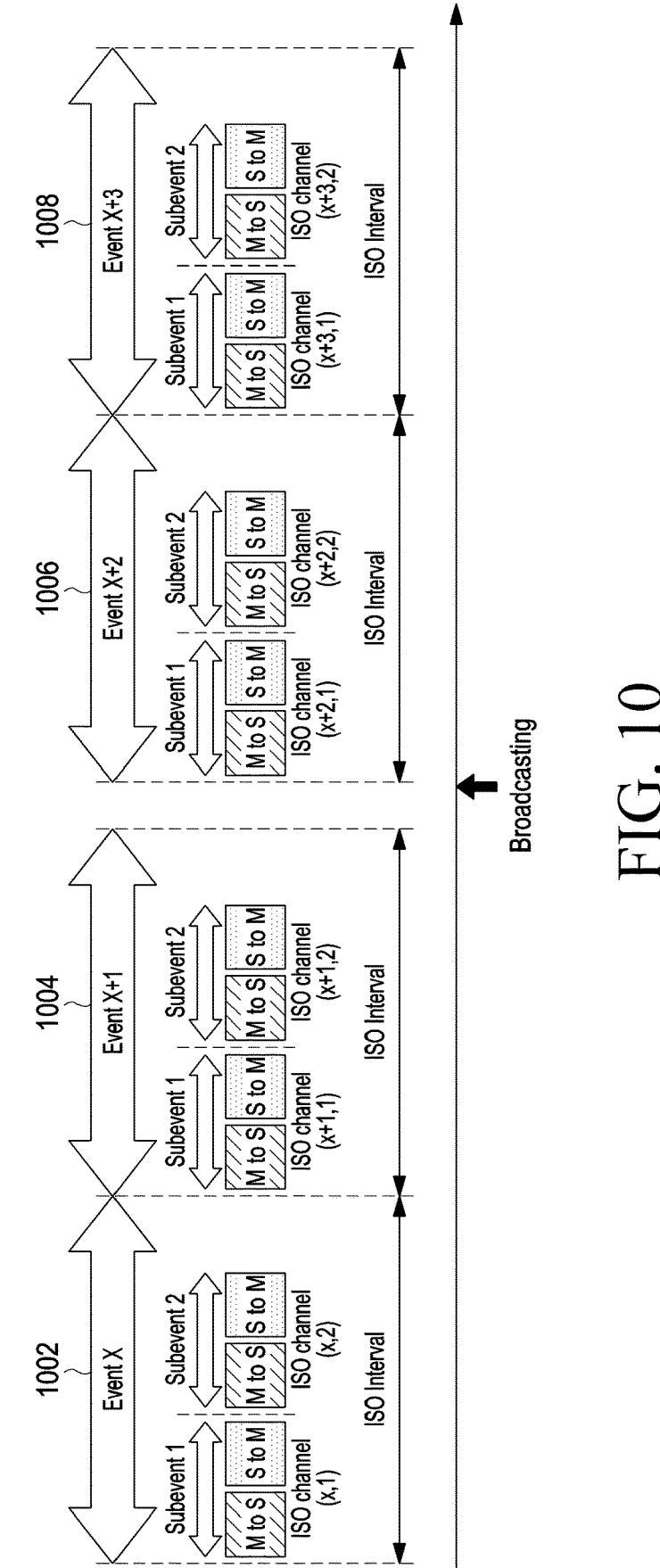
Figure 11:
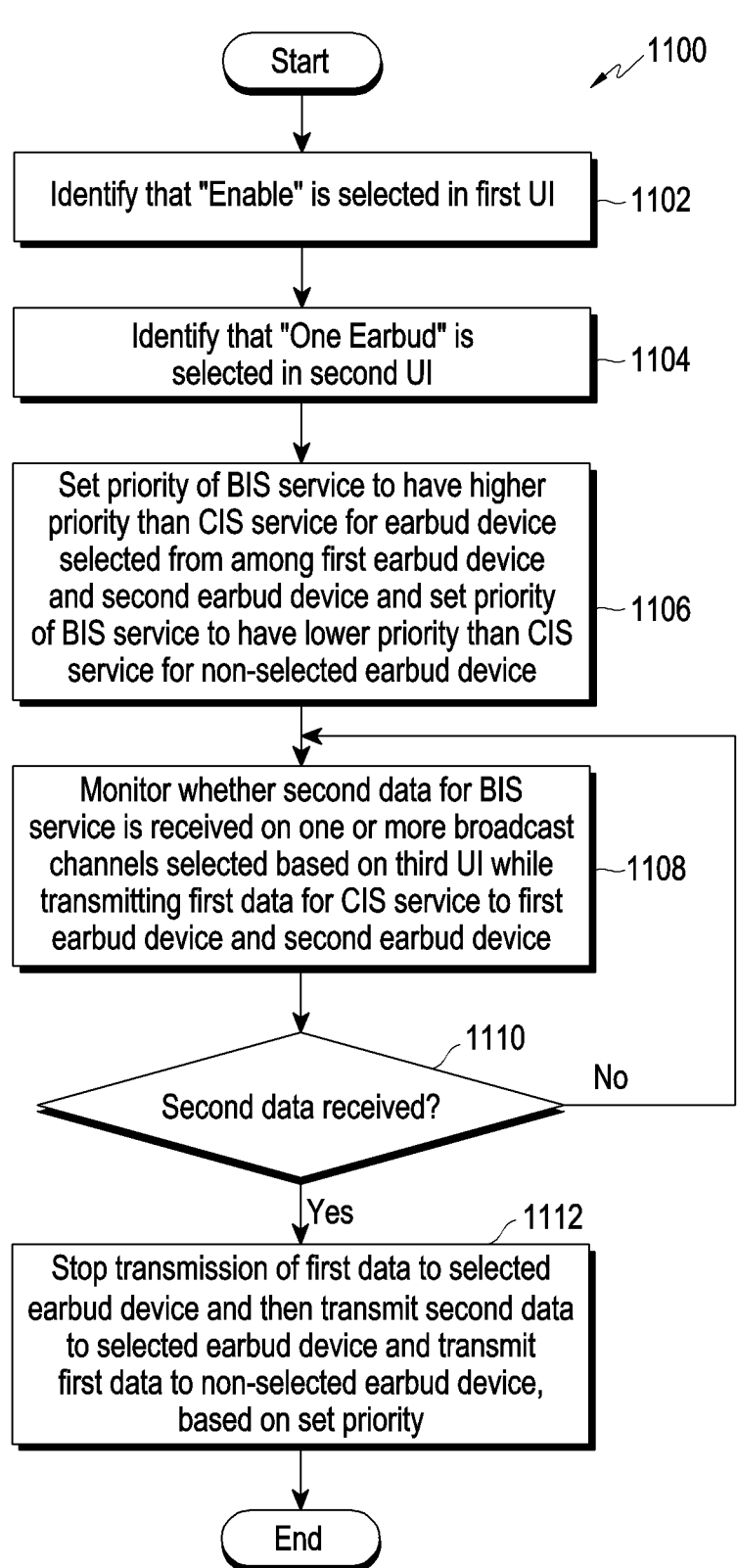
Figure 12:
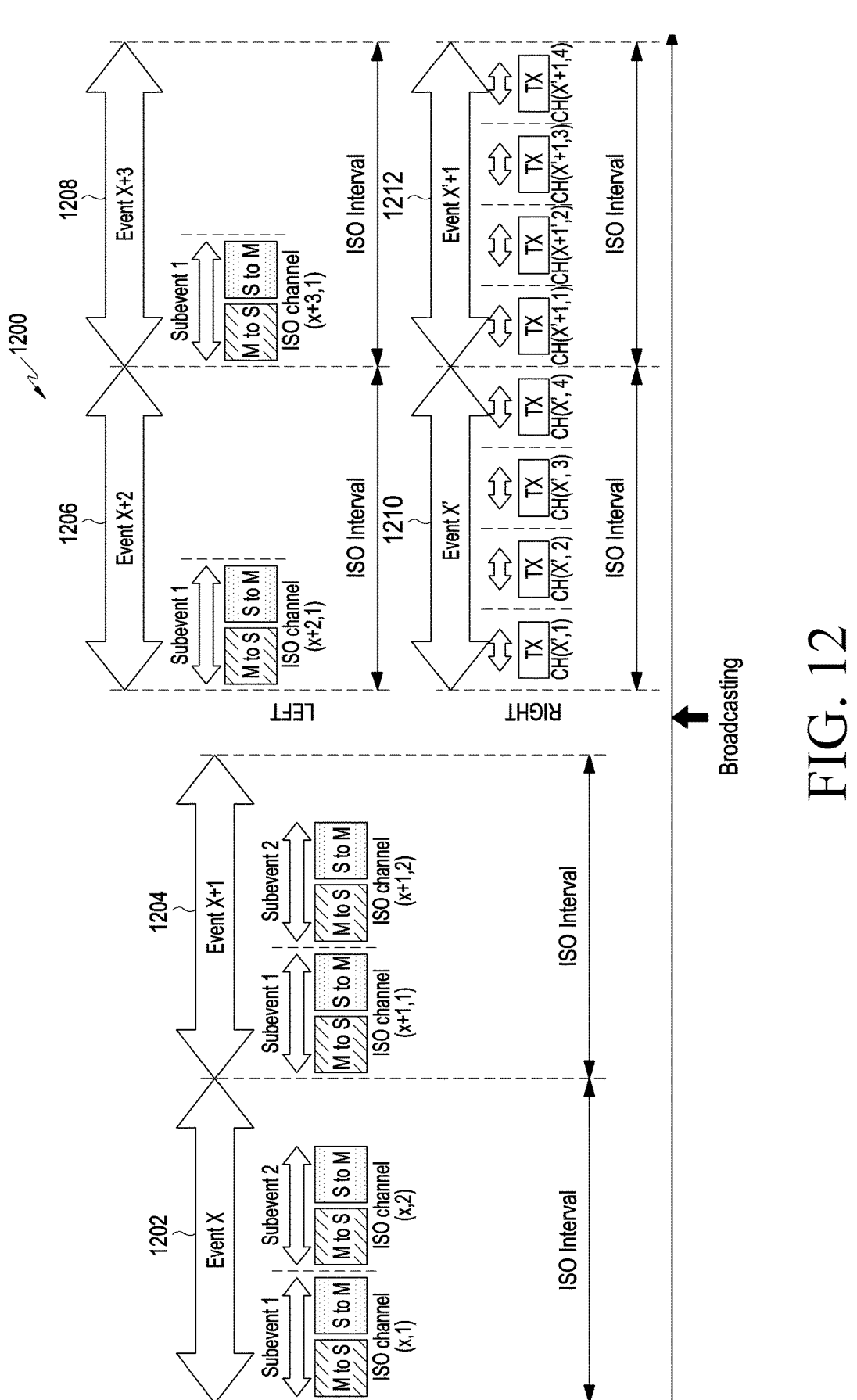
Figure 13:
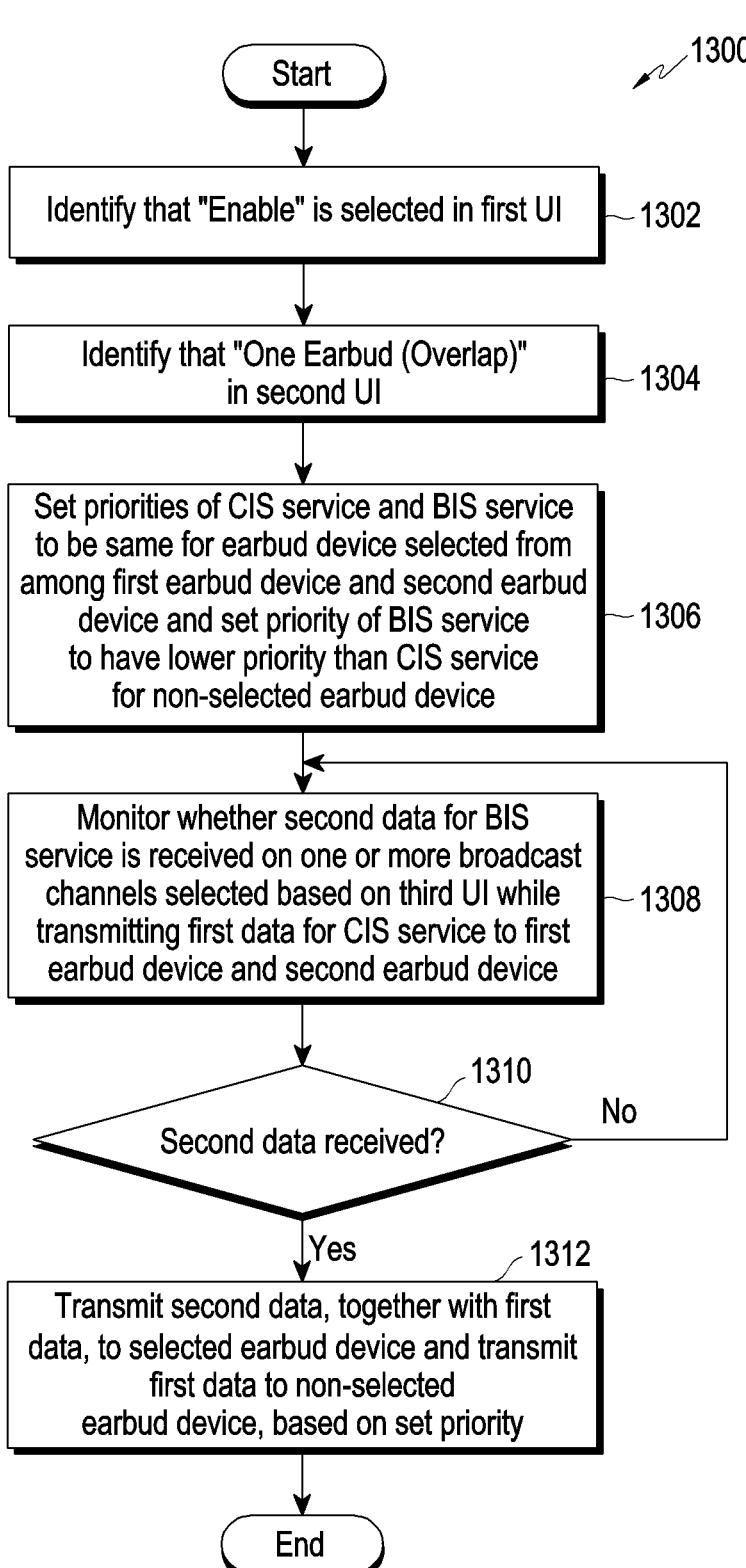
Figure 14:
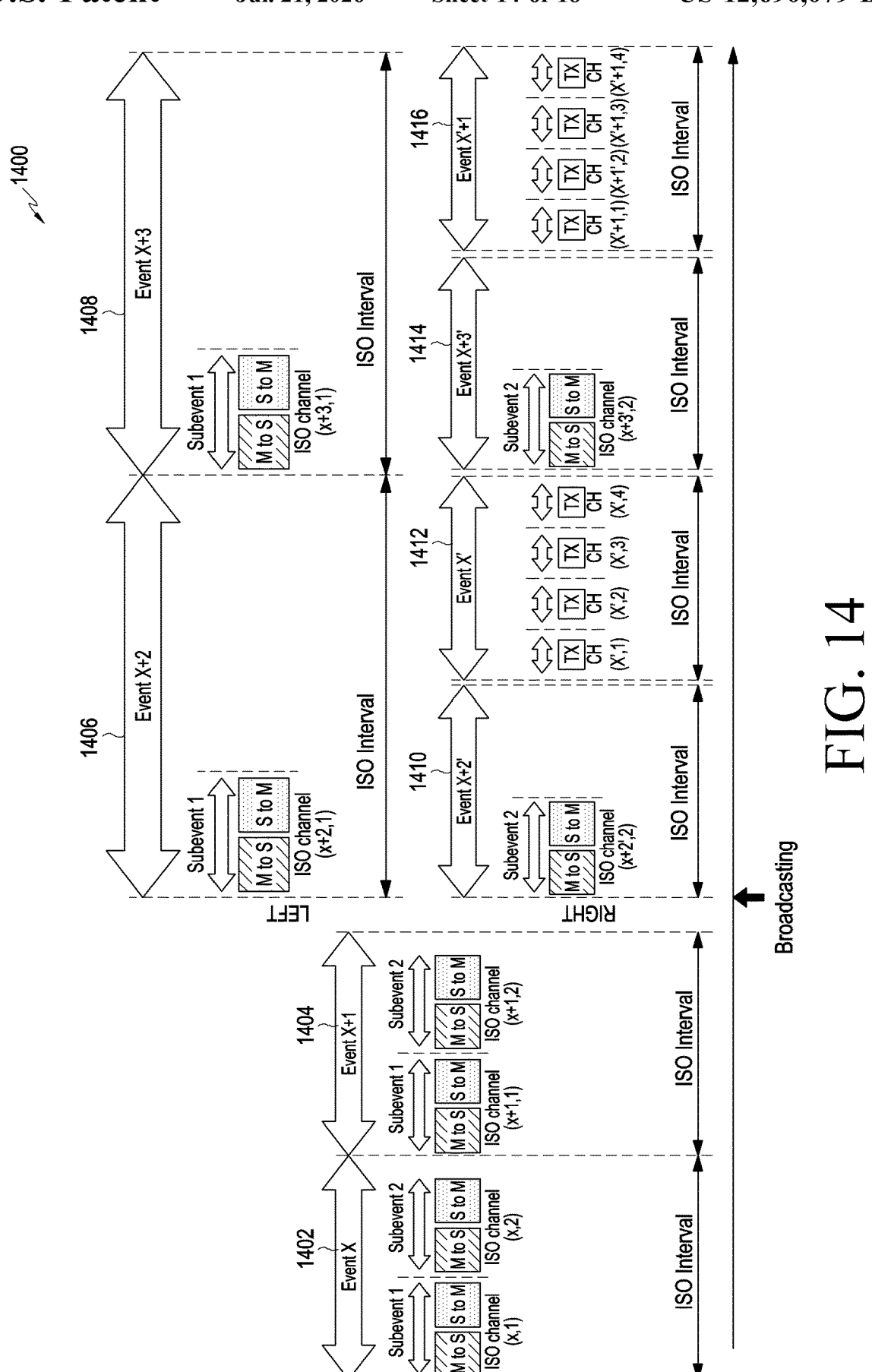
Figure 15:
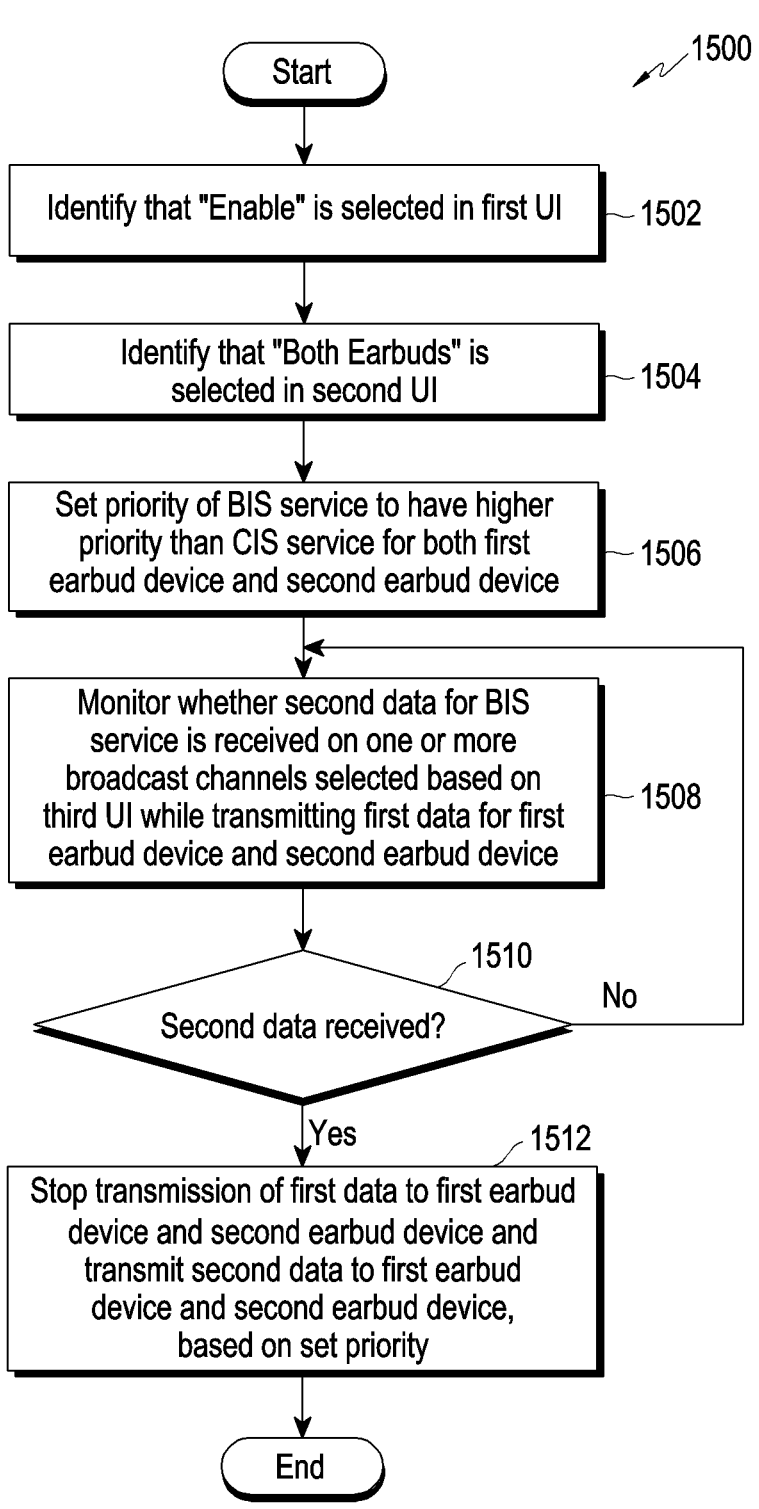
Figure 16:
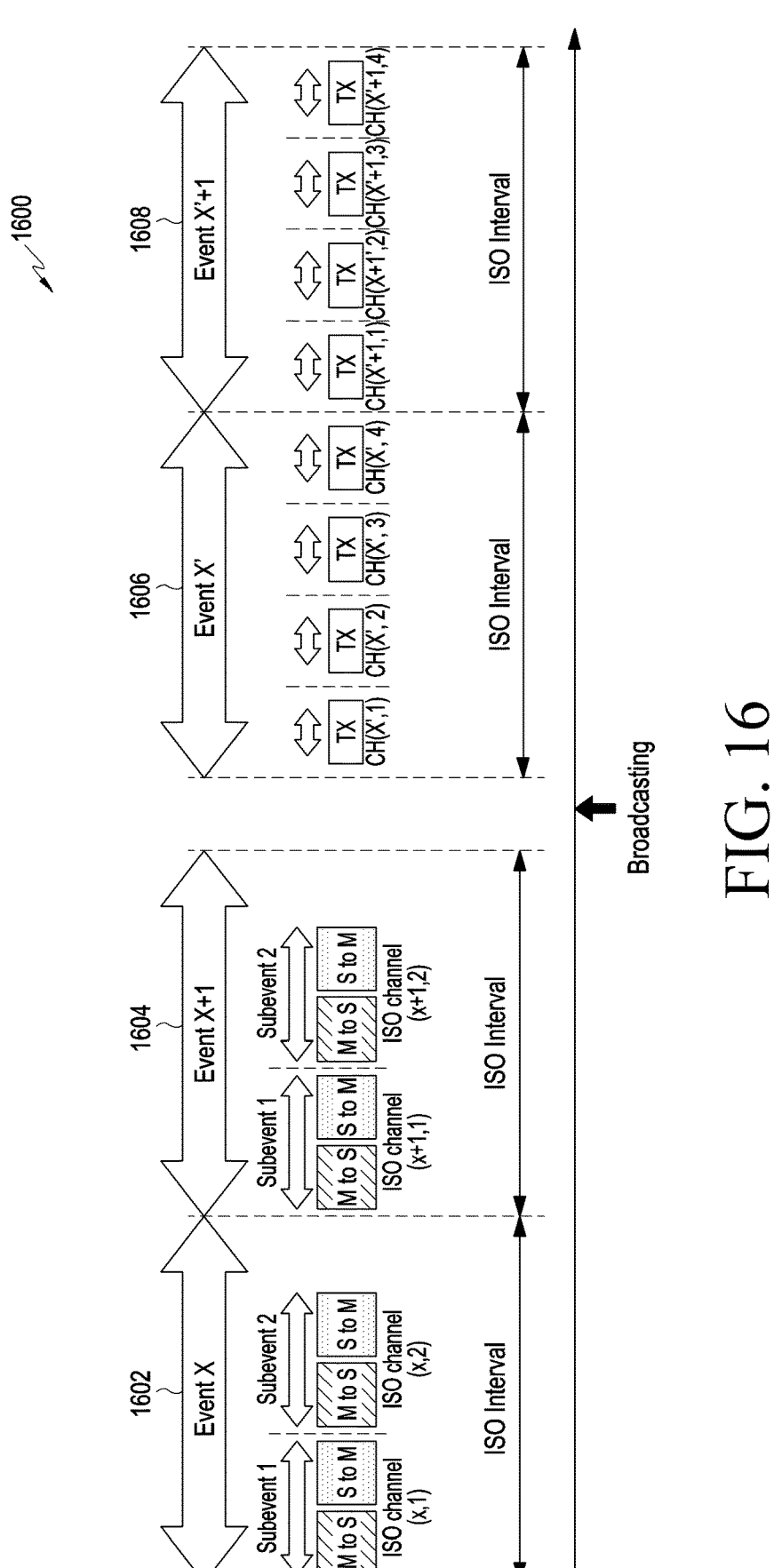
Figure 17:
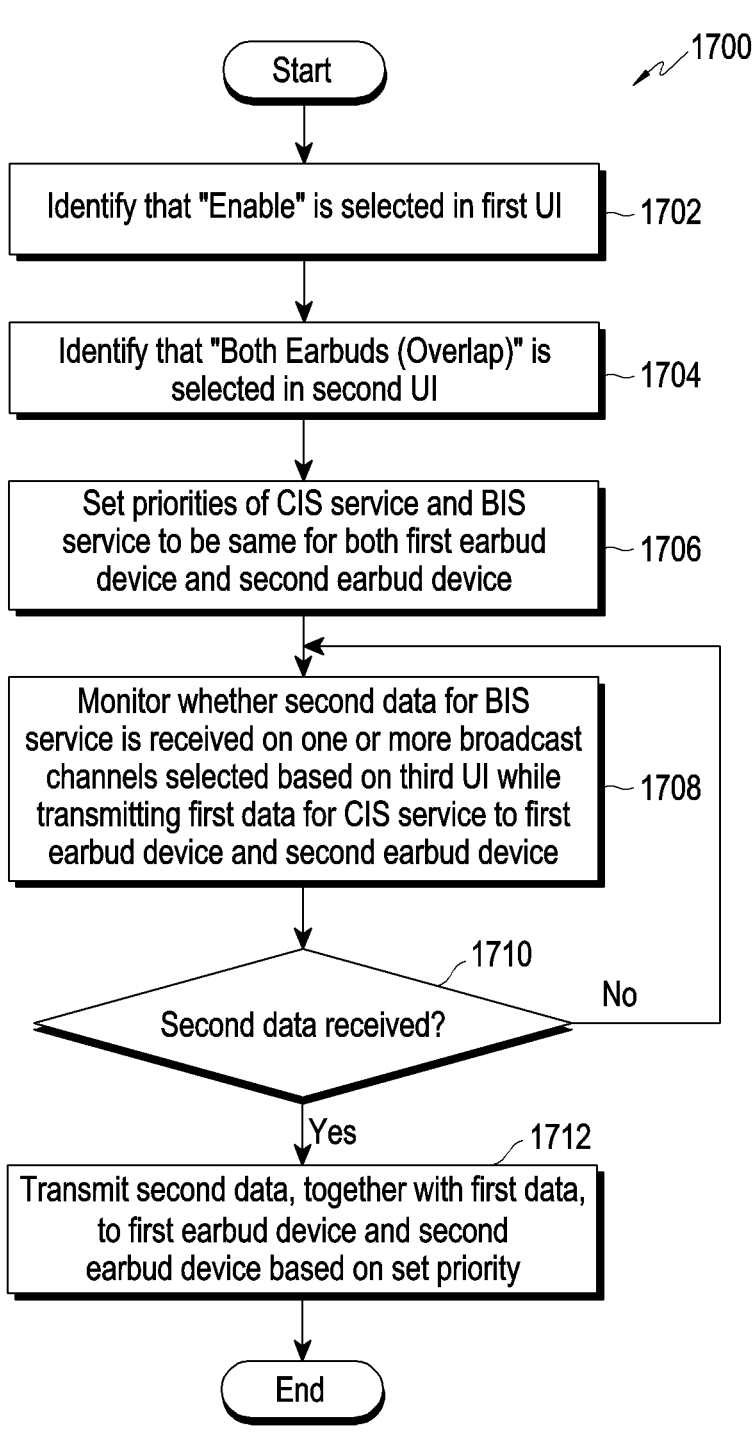
Figure 18:
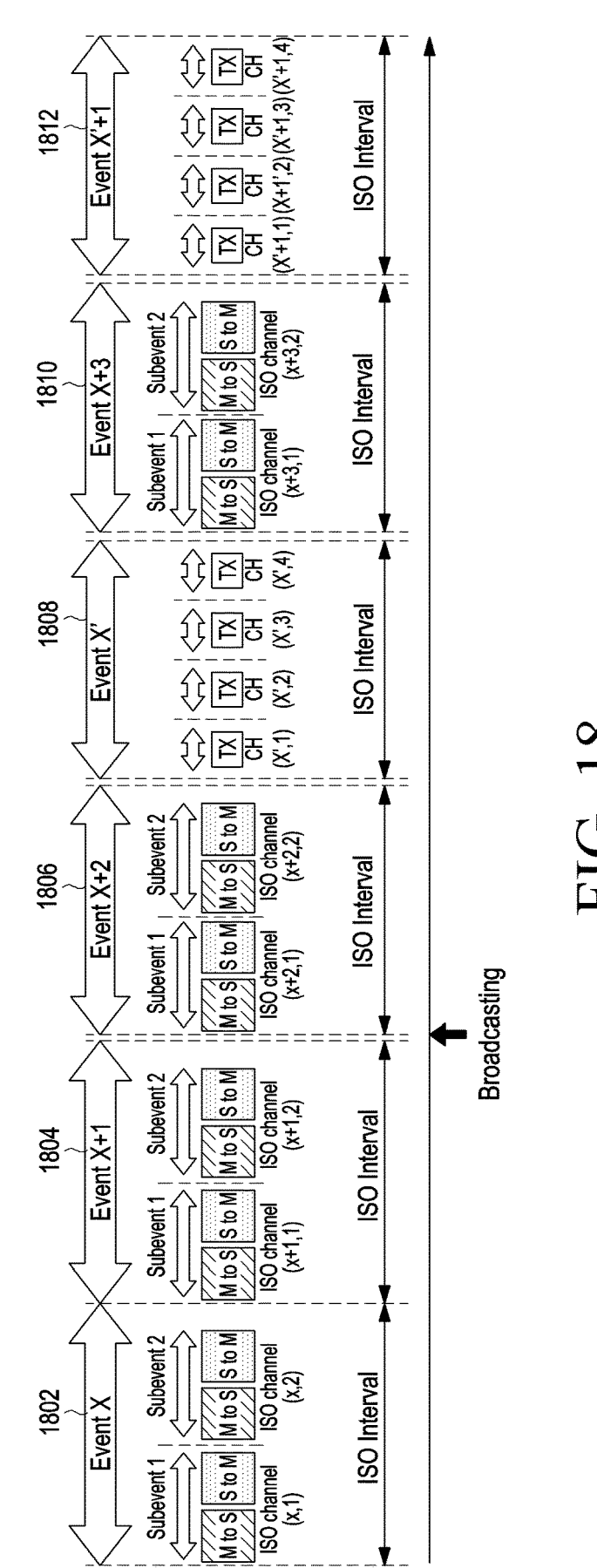

FIG. 2 is a view illustrating an electronic device and an ear-wearable device according to various embodiments;

FIG. 3A is a view illustrating connection-oriented communication according to various embodiments;

FIG. 3B is a view illustrating connectionless communication according to various embodiments;

FIG. 4 is a block diagram illustrating a configuration of an electronic device according to various embodiments;

FIG. 5 is a block diagram illustrating a configuration of an ear-wearable device according to various embodiments;

FIG. 6 is a flowchart illustrating operations of an electronic device according to various embodiments;

FIG. 7 is a flowchart illustrating an operation of transmitting second data based on a set condition by an electronic device according to various embodiments;

FIG. 8 is a view illustrating a user interface of an electronic device according to various embodiments;

FIG. 9 is a flowchart illustrating operations of an electronic device in a first case according to various embodiments;

FIG. 10 is a view illustrating a data flow to an ear-wearable device in a first case according to various embodiments;

FIG. 11 is a flowchart illustrating operations of an electronic device in a second case according to various embodiments;

FIG. 12 is a view illustrating a data flow to an ear-wearable device in a second case according to various embodiments;

FIG. 13 is a flowchart illustrating operations of an electronic device in a third case according to various embodiments;

FIG. 14 is a view illustrating a data flow to an ear-wearable device in a third case according to various embodiments;

FIG. 15 is a flowchart illustrating operations of an electronic device in a fourth case according to various embodiments;

FIG. 16 is a view illustrating a data flow to an ear-wearable device in a fourth case according to various embodiments;

FIG. 17 is a flowchart illustrating operations of an electronic device 401 in a fifth case according to various embodiments; and FIG. 18 is a view illustrating a data flow to an ear-wearable device in a fifth case according to various embodiments.

DETAILED DESCRIPTION

Hereinafter, various embodiments of the disclosure are described with reference to the accompanying drawings. When determined to make the subject matter of various embodiments of the disclosure unclear, the detailed description of the relevant known art or functions may be skipped. The terms described below are defined considering the functions in embodiments of the present disclosure and may be replaced with other terms according to the intention or practice of the user or operator. Therefore, the terms should be defined based on the overall disclosure.

The terms as used herein are provided merely to describe some embodiments thereof, but not to limit various embodiments of the disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise" or "include" should not be interpreted as necessarily including all of several components or operations set forth herein but should rather be interpreted as omitting some components or operations or adding more components or operations.

As used herein, the terms "first" and "second" may be used to describe various components, but the components should not be limited by the terms. The terms are used only to distinguish one component from another. For example, a first component may be denoted a second component, and vice versa without departing from the scope of the present disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Hereinafter, exemplary embodiments of the inventive concept will be described in detail with reference to the accompanying drawings. The same reference denotations may be used to refer to the same or substantially the same elements throughout the specification and the drawings. No duplicate description of the same elements is given herein. When determined to make the subject matter of the disclosure unclear, the detailed description of the known art or functions may be skipped. The accompanying drawings are provided for an easier understanding of the spirit of the reception but the disclosure should not be limited thereby. It should be interpreted that the spirit of the disclosure may encompasses all other changes, equivalents, or replacements of those shown in the drawings.

Hereinafter, in various embodiments of the disclosure, a terminal is described, but the terminal may also be referred to as an electronic device, mobile station, mobile equipment (ME), user equipment (UE), user terminal (UT), subscriber station (SS), wireless device, handheld device, or access terminal (AT). Alternatively, in various embodiments, the UE may be, e.g., a device having communication functionality, such as a mobile phone, a personal digital assistant (PDA), a smart phone, a wireless modem, or a laptop computer.

The description of embodiments of the disclosure focuses primarily on Bluetooth wireless communication technology, but the subject matter of the disclosure may also be applicable to other communication systems with a similar technical background with minor changes without significantly departing from the scope of the present invention, and this may be so performed by the determination of those skilled in the art to which the present invention pertains.

Figure 1:
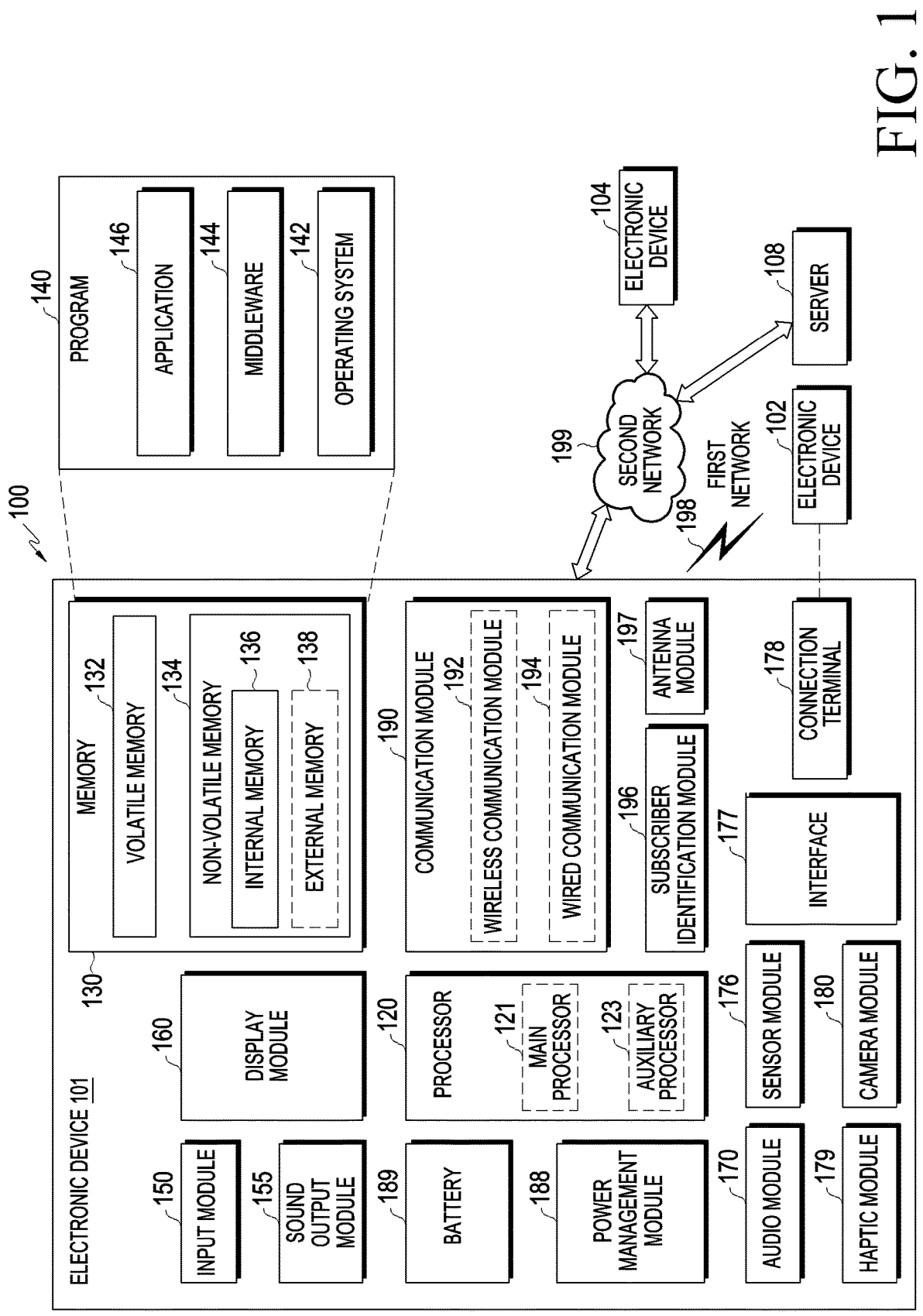
FIG. 1 is a block diagram illustrating an electronic device in a network environment according to various embodiments.

FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

According to various embodiments, a method and device for transmitting data are provided. According to various embodiments, an electronic device (e.g., the electronic device 101 of FIG. 1) may perform data transmission to external electronic devices (e.g., the electronic device 102 or the electronic device 104 of FIG. 1). In an embodiment, the electronic device may be a smart phone, and the external electronic devices may be a left earbud device and a right earbud device as ear-wearable devices. However, the electronic device is not limited to the smart phone, and the external electronic devices are not limited to the left earbud device and the right earbud device, and various changes may be made thereto according to various embodiments.

FIG. 2 is a view 200 illustrating an electronic device and an ear-wearable device according to various embodiments.

Referring to FIG. 2, an electronic device 201 may be a master device or a source device that provides data (e.g., audio data or multimedia data). The electronic device 201 may be an electronic device, such as a smart phone, or the electronic device 101 of FIG. 1.

According to an embodiment, the first earbud device 202 and the second earbud device 204 may receive data from the electronic device 201 and may be slave devices or sink devices capable of processing or outputting the received data. The first earbud device 202 may be one of the left earbud device and the right earbud device, and the second earbud device 204 may be the other of the left earbud device and the right earbud device. The first earbud device 202 and the second earbud device 204 each may be the electronic device 102 or the electronic device 104 of FIG. 1.

The electronic device 201 and the first earbud device 202, or the electronic device 201 and the second earbud device 204 may communicate with a wireless communication technology (e.g., Bluetooth legacy (or classic) or Bluetooth low energy (BLE) communication technology) to perform data transmission/reception.

In various embodiments to be described below, a case in which the electronic device 201 transmits data to two earbud devices (e.g., the first earbud device 202 and the second earbud device 204) is described. However, the number of earbud devices may not be limited to only two, and various embodiments may be applied to three or more earbud devices. Further, devices that receive data transmitted by the electronic device 201 are not limited to earbud devices, and various embodiments may also be applied to other types of devices (e.g., smartphones, smart watches, or tablet PCs) capable of wireless communication with the electronic device 201.

According to various embodiments, the electronic device 201 may establish a first communication link (link 1) to perform data communication with the first earbud device 202. According to various embodiments, the electronic device 201 may establish a second communication link (link 2) to perform data communication with the second earbud device 204. According to various embodiments, connection-oriented communication may be performed through the first communication link and the second communication link. According to various embodiments, connectionless communication between the first electronic device 201 and the first earbud device 202 and/or between the first electronic device 201 and the second earbud device 204 may be performed. Connection-oriented communication and connectionless communication may be performed through isochronous (ISO) channels.

Hereinafter, connection-oriented communication and connectionless communication are described with reference to FIGS. 3A and 3B.

FIG. 3A is a view 300 illustrating connection-oriented communication according to various embodiments.

Referring to FIG. 3A, an electronic device 301 (e.g., a smart phone) may perform connection-oriented communication that establishes a connection with the first earbud device 302 (e.g., the left earbud device) and perform communication. The electronic device 301 may perform connection-oriented communication that establishes a connection with the second earbud device 304 (e.g., the right earbud device) and performs communication.

According to various embodiments, the electronic device 301 may be the electronic device 101 of FIG. 1 or the electronic device 201 of FIG. 2. The first earbud device 302 may be the electronic device 102 or the electronic device 104 of FIG. 1, and the first earbud device 202 of FIG. 2. The second earbud device 304 may be the electronic device 102 or the electronic device 104 of FIG. 1, and the second earbud device 204 of FIG. 2.

According to an embodiment, connection-oriented communication may use a connected isochronous stream (CIS), which is a data transport stream for point-to-point communication. For example, in FIG. 3A, a first CIS 306 may be set between the electronic device 301 and the first earbud device 302, and a second CIS 308 may be established between the electronic device 301 and the second earbud device 304. The first CIS 306 may be used for unidirectional and/or bidirectional data transmission between the electronic device 301 and the first earbud device 302. The second CIS 308 may be used for unidirectional and/or bidirectional data transmission between the electronic device 301 and the second earbud device 304. Data transmission through the first CIS 306 and the second CIS 308 may be performed in units of packets and may be synchronized.

A connected isochronous group (CIG) may include one or more CISs. FIG. 3A illustrates an example in which the CIG includes the first CIS 306 and the second CIS 308. The electronic device 301 may transmit the same data through the first CIS 306 and the second CIS 308 included in the same CIG. Accordingly, the first earbud device 302 and the second earbud device 304 may receive the same data from the electronic device 301.

FIG. 3B is a view 310 illustrating connectionless communication according to various embodiments.

Referring to FIG. 3B, an electronic device 311 (e.g., a smart phone) may perform connectionless communication for transmitting broadcast data. Connectionless communication may refer to unilateral communication from the electronic device 311 to one or more earbud devices. The one or more earbud devices may include, e.g., a first earbud device 312 (e.g., a left earbud device) and a second earbud device 314 (e.g., a right earbud device), a third earbud device 316 (e.g., another left earbud device) and a fourth earbud device 318 (e.g., another right earbud device). The first earbud device 312 and the second earbud device 314 may be different from the third earbud device 316 and the fourth earbud device 318.

The electronic device 311 may be the electronic device 101 of FIG. 1, the electronic device 201 of FIG. 2, or the electronic device 301 of FIG. 3A. The first earbud device 312 (or the third earbud device 316) may be the electronic device 102 or electronic device 104 of FIG. 1, the first earbud device 202 of FIG. 2, and FIG. 3A, and the first earbud device 302 of FIG. 3A. The second earbud device 314 (or the fourth earbud device 318) may be the electronic device 102 or electronic device 104 of FIG. 1, or the second earbud device 204 of FIG. 2, and the second earbud device 304 of FIG. 3A.

In connectionless communication, synchronized streams may be used to transmit (or stream) broadcast data. Each of the synchronized streams may be a broadcast isochronous stream (BIS), which is a broadcast data transport stream, and may support retransmission to increase reliability of packet transmission. The synchronized streams may be included in a broadcast isochronous group (BIG).

In the embodiment of FIG. 3B, the first BIS 322, the second BIS 324, the third BIS 326, and the fourth BIS 328 may be used for transmission of broadcast data. The first BIS 322, the second BIS 324, the third BIS 326, and the fourth BIS 328 may be synchronized and included in the same BIG. The first earbud device 312 may receive broadcast data through the first BIS 322, the second earbud device 314 may receive broadcast data through the second BIS 324, the third earbud device 316 may receive broadcast data via the third BIS 326, and the fourth earbud device 318 may receive the broadcast data via the fourth BIS 328.

FIG. 4 is a block diagram 400 illustrating a configuration of an electronic device according to various embodiments.

According to various embodiments, the electronic device 401 may be the electronic device 101 of FIG. 1, the electronic device 201 of FIG. 2, the electronic device 301 of FIG. 3A, and the electronic device 311 of FIG. 3B.

According to various embodiments, the electronic device 401 may include the same or similar components to at least one of the components (e.g., modules) of the electronic device 101 illustrated in FIG. 1. Referring to FIG. 4, the electronic device 401 may include an antenna module 411 (e.g., the antenna module 197 of FIG. 1), a communication module 410 (e.g., the communication module 190 of FIG. 1), a memory 420 (e.g., the memory 130 of FIG. 1), and a processor 430 (e.g., the processor 120 of FIG. 1).

According to various embodiments, the communication module 410 may include at least one of a wireless communication module (e.g., a Bluetooth™ communication module, a cellular communication module, a Wi-Fi communication module, a near-field communication (NFC) communication module, or a global navigation satellite system (GNSS) communication module) or a wired communication module (e.g., a LAN communication module or a PLC communication module).

The communication module 410 may directly or indirectly communicate with at least one external electronic device through at least one communication module included therein. According to various embodiments, the at least one external electronic device may be at least one of the electronic device 102 or the electronic device 104 of FIG. 1, the first earbud device 202 and the second earbud device 204 of FIG. 2, The first earbud device 302 and the second earbud device 304 of FIG. 3A, the first earbud device 312 and the second earbud device 314 or the third earbud device 316 and the fourth earbud device 318 of FIG. 3B.

In various embodiments, the communication module 410 may perform data transmission via CIS and/or broadcast data transmission via BIS. The communication module 410 may include one or more communication processors that are operable independently from the processor 490 and supports wired or wireless communication. In an embodiment, the communication module 410 may be referred to as a communication interface.

According to various embodiments, the antenna module 411 may transmit/receive a signal or information to/from another electronic device (e.g., at least one external electronic device).

According to an embodiment, the antenna module 411 may include a plurality of antennas, and at least one antenna suitable for a communication scheme used in a communication network may be selected by the communication module 410 from the plurality of antennas. The signal or information may then be transmitted or received between the communication module 410 and another electronic device via the selected at least one antenna.

According to various embodiments, the memory 420 may store various data used by at least one component (e.g., the communication module 410 and/or the processor 430) of the electronic device 401. The various data may include, for example, software and input data or output data for a command related thereto. According to an embodiment, the data may include dedicated data (e.g., audio data or multimedia data) and/or broadcast data to be transmitted to at least one external electronic device. The memory 420 may include a volatile memory or a non-volatile memory.

According to various embodiments, the processor 430 may execute, e.g., software to control at least one other component (e.g., a hardware or software component) of the electronic device 401 connected with the processor 430 and may process or compute various data. According to an embodiment, as at least part of the data processing or computation, the processor 430 may load a command or data received from another component (e.g., the communication module 410) onto a volatile memory 420, process the command or the data stored in the volatile memory, and store resulting data in a non-volatile memory.

According to various embodiments, the processor 430 may perform the operations of the electronic device 401 which are to be described below.

According to various embodiments, the electronic device 401 may further include various modules depending on the form in which it is provided. There are many variations according to the convergence trend of digital devices, so it is not possible to list them all, but components equivalent to the above-mentioned components may be further included in the electronic device 401. Further, it is apparent that in the electronic device 401 according to an embodiment, specific components may be excluded from the above components or replaced with other components according to the form in which it is provided. This will be easily understood by those of ordinary skill in the art.

FIG. 5 is a block diagram 500 illustrating a configuration of an ear-wearable device according to various embodiments.

According to various embodiments, an ear-wearable device 503 may include a first earbud device 502 and a second earbud device 504.

According to various embodiments, the first earbud device 502 may be the electronic device 102 or electronic device 104 of FIG. 1, the first earbud device 202 of FIG. 2, the first earbud device 302 of FIG. 3A, and the first earbud device 312 or third earbud device 316 of FIG. 3B. The second earbud device 504 may be the electronic device 102 or electronic device 104 of FIG. 1, the second earbud device 204 of FIG. 2, the second earbud device 304 of FIG. 3A, and the second earbud device 314 or the fourth earbud device 318 of FIG. 3B.

Referring to FIG. 5, the first earbud device 502 may include an antenna module 511, a communication module 510, an input module 520, a sensor module 530, an audio processing module 540, a memory 550, and a power management module 560, a battery 570, an interface 580, and/or a processor 590.

According to various embodiments, the communication module 510 may include at least one of a Bluetooth communication module, a cellular communication module, a Wi-Fi communication module, an NFC communication module, or a GNSS communication module.

The communication module 510 may communicate with the electronic device 401 through at least one communication module included therein. In an embodiment, the communication module 510 may include one or more communication processors that are operable independently from the processor 590 and supports wired or wireless communication.

According to various embodiments, the antenna module 511 may transmit/receive a signal or information to/from the electronic device 401. According to an embodiment, the antenna module 511 may include a plurality of antennas. According to an embodiment, at least one antenna appropriate for a communication scheme used in a communication network, such as the first network (e.g., the first network 198 of FIG. 1) or the second network (e.g., the second network 199 of FIG. 2), may be selected from the plurality of antennas by the communication module 510. The signal or information may then be transmitted or received between the communication module 510 and another electronic device via the selected at least one antenna.

According to various embodiments, the input module 520 may be configured to generate various input signals that may be used for operation of the first earbud device 502. The input module 520 may include, e.g., a touch pad, a touch panel, or a button. The touch pad may recognize touch inputs in at least one of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key.

According to various embodiments, the input module 520 may receive the user input associated with data (e.g., audio data or multimedia data). For example, the user input may be associated with functions of starting playback of data, pausing playback, stopping playback, adjusting playback speed, adjusting playback volume, or muting. The operation of the first earbud device 502 may be controlled by various gestures, such as tapping or swiping up/down the surface on which the touch pad is installed.

According to various embodiments, the sensor module 530 may identify a position or operational state of the first earbud device 502. The sensor module 330 may convert the measured or identified information into an electrical signal. The sensor module 330 may include at least one of, e.g., a magnetic sensor, an acceleration sensor, a gyro sensor, a geomagnetic sensor, a proximity sensor, a gesture sensor, a grip sensor, a biometric sensor, or an optical sensor. In an embodiment, the optical sensor may include a light emitting unit (e.g., a light emitting diode (LED)) that outputs light of at least one wavelength band. The optical sensor may include a light receiving unit (e.g., a photodiode) that receives light of one or more wavelength bands scattered or reflected from an object and generates an electrical signal.

According to various embodiments, the audio processing module 540 may support an audio data gathering function and reproduce the gathered audio data. According to an embodiment, the audio processing module 540 may include an audio decoder (not shown) and a D/A converter (not shown). The audio decoder may convert audio data stored in the memory 550 or received from the electronic device 401 through the communication module 510 into a digital audio signal. The D/A converter may convert the digital audio signal converted by the audio decoder into an analog audio signal. According to various embodiments, the audio decoder may convert audio data received from the electronic device 401 through the communication module 510 and stored in the memory 550 into a digital audio signal. The speaker 541 may output the analog audio signal converted by the D/A converter. According to an embodiment, the audio processing module 540 may include an A/D converter (not shown). The A/D converter may convert the analog audio signal transferred through the microphone 542 into a digital voice signal.

According to various embodiments, the microphone 542 may include at least one air conduction microphone and/or at least one bone conduction microphone for detecting voice. The air conduction microphone may detect the voice (e.g., the user's utterance) transferred through air and output a voice signal corresponding to the detected voice. The bone conduction microphone may measure the vibration of the user's bone (e.g., skull) due to the user's utterance and may output a voice signal corresponding to the measured vibration. The bone conduction microphone may be referred to as a bone conduction sensor or in other various terms. The voice detected by the air conduction microphone is a voice mixed with external noise while the user's utterance is transferred through the air, whereas the voice detected by the bone conduction microphone may be mixed with less noise (e.g., influence by noise) because it is detected from the vibration of the bone. Therefore, the bone conduction microphone may output a voice signal corresponding to the user's voice with reduced external noise even in a high-noise environment. According to various embodiments, the voice signal output from the microphone 542 may be transferred to the processor 590. According to an embodiment, an acceleration sensor (e.g., the sensor module 530) may be used to obtain a voice signal corresponding to the user's voice with reduced external noise. For example, the acceleration sensor may measure the vibration of the user's skin due to the user's voice utterance and output a voice signal corresponding to the measured vibration to the processor 590. Since the voice (e.g., vibration) detected by the acceleration sensor is detected from the vibration of the skin, the inflow of external noise (e.g., the influence by noise) may be small. The above-described bone conduction microphone and/or acceleration sensor may be referred to as a voice pickup unit (VPU) or may be referred to in other various terms.

According to various embodiments, the audio processing module 540 may play various audio data set in the operation of the first earbud device 502. For example, the processor 590 may be designed to detect insertion or removal of the first earbud device 502 into/from the user's ear through the sensor module 530 and reproduce audio data regarding an effect sound or guide sound through the audio processing module 540. The output of the sound effect or guide sound may be omitted according to the user setting or the designer's intention.

According to various embodiments, the memory 550 may store various data used by at least one component (e.g., the processor 590 or a sensor module 530) of the first earbud device 502. The various data may include, for example, software and input data or output data for a command related thereto. According to an embodiment, the data may include data received from the electronic device 401 through CIS or BIS. The memory 550 may include a volatile memory or a non-volatile memory.

According to various embodiments, the power management module 560 may manage power supplied to the first earbud device 502. According to one embodiment, the power management module 560 may be implemented as at least part of, for example, a PMIC. According to an embodiment, the power management module 560 may include a battery charging module. According to an embodiment, when the electronic device 401 is electrically connected to the first earbud device 502 (wirelessly or wiredly), the power management module 560 may receive power from the electronic device 401 and charge the battery 570.

According to various embodiments, the battery 570 may supply power to at least one component of the first earbud device 502. According to an embodiment, the battery 570 may include, e.g., a rechargeable battery.

According to various embodiments, the interface 580 may support one or more designated protocols that may be used for the first earbud device 202 to directly (e.g., wiredly) connect to the electronic device 401, the second earbud device 504, or another electronic device. According to an embodiment, the interface 380 may include, for example, a high definition multimedia interface (HDMI), a universal serial bus (USB) interface, a secure digital (SD) card interface, or an audio interface. According to an embodiment, the interface 580 may include a connection port for forming a physical connection with the electronic device 401.

According to various embodiments, the processor 590 may execute software to control at least one other component (e.g., a hardware or software component) of the first earbud device 502 connected with the processor 590 and may process or compute various data. According to an embodiment, as at least part of the data processing or computation, the processor 590 may load a command or data received from another component (e.g., the sensor module 530 or communication module 510) onto a volatile memory 550, process the command or the data stored in the volatile memory, and store resulting data in a non-volatile memory.

According to an embodiment, the processor 590 may form a communication connection with the electronic device 401 through the communication module 510 and receive data (e.g., audio data) from the electronic device 401 through the formed communication connection. According to an embodiment, the processor 590 may process the data received from the electronic device 401 through the audio processing module 540 and output it to the speaker 541.

According to an embodiment, the processor 590 may perform the operations of the first earbud device 502 which are to be described below.

According to various embodiments, the first earbud device 502 may further include various modules depending on the form in which it is provided. There are many variations according to the convergence trend of digital devices, so it is not possible to list them all, but components equivalent to the above-mentioned components may be further included in the first earbud device 502. Further, it is apparent that in the first earbud device 502 according to an embodiment, specific components may be excluded from the above components or replaced with other components according to the form in which it is provided. This will be easily understood by those of ordinary skill in the art.

According to various embodiments, the second earbud device 504 may be a component of the ear-wearable device 503 configured as a pair with the first earbud device 502. The second earbud device 504 may include the same or similar components to those included in the first earbud device 502 and may perform all or some of the operations of the second earbud device 504 described below in connection with the drawings.

According to various embodiments, one or more earbud devices configured in pair with the first earbud device 502 may be further included as components of the ear-wearable device 503. One or more earbud devices may also include the same or similar components included in the first earbud device 502 and perform the same or similar operations as all or some of the operations of the first earbud device 502 or the second earbud device 504 described below with reference to the drawings.

According to various embodiments, an electronic device (e.g., the electronic device 101 of FIG. 1, the electronic device 201 of FIG. 2, the electronic device 301 of FIG. 3A, the electronic device 311 of FIG. 3B, or the electronic device 401 of FIG. 4) may comprise a memory (e.g., the memory 130 of FIG. 1 and the memory 420 of FIG. 4), a communication circuit (e.g., the communication module 190 of FIG. 1 and the communication module 410 of FIG. 4) configured to perform communication with at least two external electronic devices (e.g., the electronic device 102 or electronic device 104 of FIG. 1, the first earbud device 202 and second earbud device 204 of FIG. 2, the first earbud device 302 and second earbud device 304 of FIG. 3A, the first earbud device 312 and second earbud device 314 of FIG. 3B or the third earbud device 316 and fourth earbud device 318 and the first earbud device 502 and the second earbud device 504 of FIG. 3B) through at least two communication links, and at least one processor (e.g., the processor 120 of FIG. 1 and the processor 430 of FIG. 4) operatively connected with the memory and the communication circuit. The memory may store computer-executable instructions configured to, when executed, cause the at least one processor to transmit first data to each of the at least two external electronic devices through the at least two communication links, monitor whether second data, which is broadcast data, is received while transmitting the first data, and transmit the second data, instead of the first data, to at least one of the at least two external electronic devices based on a set condition in case the reception of the second data is identified based on a result of the monitoring.

According to an embodiment, the set condition may include a condition set based on at least one of: a) whether it is determined that at least one of the at least two external electronic devices is to receive the second data, b) whether at least one external electronic device for receiving the second data is selected from among the at least two external electronic devices, and c) whether the second data is data of a configured broadcast channel.

According to an embodiment, when executed, the instructions are configured to cause the at least one processor to, based on determining that at least one of the at least two external electronic devices is to receive the second data, select a first external electronic device among the at least two external electronic devices for receiving the second data. In case it is determined that the second data is data of a configured broadcast channel, the instructions cause the processor to transmit the second data, instead of the first data, to the first external electronic device, and transmit the first data to at least one second external electronic device except for the first external electronic device among the at least two external electronic devices.

According to an embodiment, when executed, the instructions are configured to cause the at least one processor to, based on determining that at least one of the at least two external electronic devices is to receive the second data, select a first external electronic device among the at least two external electronic devices for receiving the first data and the second data. Alternatively, in case the second data is data of a configured broadcast channel, the instructions cause the processor to transmit the first data and the second data to the first external electronic device and transmit the first data to at least one second external electronic device except for the first external electronic device among the at least two external electronic devices.

According to an embodiment, when executed, the instructions are configured to cause the at least one processor to transmit the first data and the second data to the first external electronic device during a same time or different times.

According to an embodiment, when executed, the instructions are configured to cause the at least one processor to, based on determining that at least one of the at least two external electronic devices is to receive the second data, select the at least two external electronic devices for receiving the second data. Alternatively, in the case that the second data is data of a configured broadcast channel, the instructions cause the processors to transmit the second data, instead of the first data, to the at least two external electronic devices.

According to an embodiment, when executed, the instructions are configured to cause the at least one processor to, based on determining that at least one of the at least two external electronic devices is to receive the second data, select the at least two external electronic devices for receiving the first data and the second data. Alternatively, in the case that the second data is data of a configured broadcast channel, the instructions cause the processors to transmit the first data and the second data to the at least two external electronic devices.

According to an embodiment, when executed, the instructions are configured to cause the at least one processor to transmit the first data and the second data to the at least two external electronic devices during a same time or different times.

According to an embodiment, when executed, the instructions are configured to cause the at least one processor to, based on determining that at least one of the at least two external electronic devices is not to receive the second data, stop monitoring whether the second data is received or transmit the first data to at least one of the at least two external electronic devices although the second data is received.

According to an embodiment, when executed, the instructions are configured to cause the at least one processor to, in response to completion of the transmission of the second data, retransmit the first data.

Hereinafter, operations of the electronic device 401, the first earbud device 502, and the second earbud device 504 are described according to various embodiments. The operations of the electronic device 401, the first earbud device 502, and the second earbud device 504 described below may be operations performed by the processor 430 of the electronic device 401, the processor 590 of the first earbud device 502, and the processor of the second earbud device 504.

FIG. 6 is a flowchart illustrating operations of an electronic device 401 according to various embodiments.

According to various embodiments, the operations shown in FIG. 6 are not limited to the shown order but may rather be performed in other various orders. According to various embodiments, more or less operations than those of FIG. 6 may be performed.

Referring to FIG. 6, in operation 602, the electronic device 401 may transmit first data to each of at least two external electronic devices (e.g., the first earbud device 502 and the second earbud device 504) through at least two communication links (e.g., the first communication link link 1 and the second communication link link 2 of FIG. 2). In an embodiment, the first data may include audio data, and when at least two external electronic devices are devices capable of display, the first data may include display data or multimedia data.

According to an embodiment, the electronic device 401 may transmit the first data to at least two external electronic devices using at least two CISs (e.g., the first CIS 306 and second CIS 308 of FIG. 3A). At least two CISs may be included in the same CIG. According to an embodiment, the first data may be data of a CIS service (e.g., an audio streaming service).

In operation 604, the electronic device 401 may monitor whether second data, which is broadcast data, is received while transmitting the first data to at least two external electronic devices. In an embodiment, the second data may be data of a BIS service (e.g., an announcement service).

According to an embodiment, the operation of monitoring whether the second data is received may be performed periodically or continuously while the electronic device 401 transmits the first data to the at least two external electronic devices. According to an embodiment, the operation of monitoring whether the second data is received may include a scan operation (e.g., a BLE scan operation) for identifying whether the second data is received on a broadcast channel. According to an embodiment, the operation of monitoring whether the second data is received may not be performed when the user does not want to receive the second data.

According to an embodiment, the second data may be data on the broadcast channel selected by the user. According to an embodiment, the second data may be data broadcast from an external electronic device different from the at least two external electronic devices.

In operation 606, in case that reception of the second data is identified based on a result of monitoring, the electronic device 401 may transmit the second data, instead of the first data, to at least one of the at least two external electronic devices based on a set condition. According to an embodiment, the electronic device 401 may transmit the second data to at least one of the at least two external electronic devices using at least one BIS (e.g., at least one of the first BIS 322, the second BIS 324, the third BIS 326, and the fourth BIS 328 of FIG. 3B). When the number of at least one BIS is two or more, the two or more BISs may be included in the same BIG.

According to various embodiments, in case that the reception of the second data is not identified based on the result of monitoring, the electronic device 401 may perform the operation of transmitting the first data in operation 602.

According to various embodiments, the operation performed in operation 606, e.g., transmitting the second data based on the set condition, may include an operation as shown in FIG. 7, as an example.

FIG. 7 is a flowchart 700 illustrating an operation of transmitting second data based on a set condition by an electronic device according to various embodiments.

According to various embodiments, the operations shown in FIG. 7 are not limited to the shown order but may rather be performed in other various orders. According to various embodiments, more or less operations than those of FIG. 7 may be performed.

Referring to FIG. 7, the electronic device 401 may perform operation 702 following operation 604 of FIG. 6. For example, in operation 604 of FIG. 6, the electronic device 401 may monitor whether second data is received on the broadcast channel while transmitting the first data to at least two external electronic devices and may perform operation 702.

In operation 702, the electronic device 401 may identify reception of the second data based on the monitoring result.

In operation 704, the electronic device 401 may identify whether the second data is data of a configured broadcast channel According to an embodiment, the configured broadcast channel is a channel for using a BIS service and may be a channel selected by the user from among one or more broadcast channels.

In an embodiment, when the second data is not data of the configured broadcast channel, the electronic device 401 may terminate all operations and perform the monitoring operation of operation 604 of FIG. 6. When the second data is data of the configured broadcast channel, the electronic device 401 may perform operation 706.

In operation 706, the electronic device 401 may identify whether it is set to receive the second data using all of the at least two external electronic devices (e.g., the first earbud device 502 and the second earbud device 504).

When it is set to receive the second data using all of the at least two external electronic devices, the electronic device 401 may transmit the second data to all of the at least two external electronic devices in operation 708.

When it is not set to receive the second data using all of the at least two external electronic devices or it is set to receive the second data using at least one of the at least two external electronic devices, the electronic device 401 may transmit the second data to at least one external electronic device (e.g., the first earbud device 502 or the second earbud device 504) for which reception of the second data is configured, among the at least two external electronic devices in operation 710.

If the transmission of the second data is complete in operation 712, the electronic device 401 may transmit first data to each of at least two external electronic devices through at least two communication links.

FIG. 8 is a view 800 illustrating a user interface of an electronic device according to various embodiments.

According to various embodiments, the electronic device 401 may provide a user interface (UI) related to at least two external electronic devices (e.g., the first earbud device 502 and the second earbud device 504). In various embodiments described below, a UI displayed on the display (e.g., the display module 160 of FIG. 1) of the electronic device 401 is described as an example, but an audio type of UI, such as a voice message, and/or a UI displayed on the display may be provided.

(a) of FIG. 8 exemplifies a first UI for selecting whether to use a BIS service (e.g., an LE broadcasting service) based on broadcast data according to various embodiments. According to an embodiment, the first UI may include a UI for selecting "Enable" or "Disable." "Enable" may be selected to use the BIS service, and "Disable" may be selected when the BIS service is not used.

(b) of FIG. 8 exemplifies a second UI for selecting at least one external electronic device according to various embodiments. According to an embodiment, the second UI may include a UI for selecting at least one of the first earbud device 502 and the second earbud device 504. For example, the second UI may include a UI for selecting one of "One Earbud," "One Earbud (Overlap)," "Both Earbuds," and "Both Earbuds (Overlap)."

According to an embodiment, "One Earbud" may be a UI for selecting one of the first earbud device 502 and the second earbud device 504 as a device for using the BIS service. "One Earbud (Overlap)" may be a UI for selecting one of the first earbud device 502 and the second earbud device 504 as a device for using the overlap service. According to an embodiment, the overlap service may indicate a service in which first data through the CIS and second data through the BIS are provided together. "Both Earbuds" may be a UI for selecting both the first earbud device 502 and the second earbud device 504 as devices for using the BIS service. "Both Earbuds (Overlap)" may be a UI for selecting both the first earbud device 502 and the second earbud device 504 as devices for using the overlap service.

(c) of FIG. 8 exemplifies a third UI for selecting a channel for using a BIS service according to various embodiments. According to an embodiment, the third UI may include a UI for selecting at least one of one or more broadcast channels. For example, the third UI may include a plurality of broadcast channels including a UI (e.g., Airport info Channel) for selecting a first broadcast channel for receiving an airport announcement (e.g., an announcement providing information about a flight to be boarded), a UI (e.g., Museum Channel) for selecting a second broadcast channel for receiving information about a desired artist or picture at an art gallery, or a UI (e.g., Department Channel) for selecting a third broadcast channel for receiving a department store announcement (e.g., an announcement providing information about a specific floor or a specific product). The user may select one or more desired broadcast channels based on the third UI. It is understood that the broadcast channels are not limited to the above examples, and that in other embodiments, the broadcast channel can include any other types of information broadcasting.

When "Disable" is selected in the first UI of FIG. 8(a), the second UI as shown in FIG. 8(b) and the third UI as shown in FIG. 8(c) may not be selected or may be disregarded. When "Enable" is selected in the first UI of FIG. 8 (a), one of "One Earbud," "One Earbud (Overlap)," "Both Earbuds," and "Both Earbuds (Overlap)" in the second UI of FIG. 8(b) may be selected, and one or more channels may be selected based on the third UI of FIG. 8(c). This may be briefly summarized as shown in Table 1 below.

TABLE 1

| First UI (whether to use BIS service) | Second UI (device using BIS service) | Third UI (channel using BIS service) |
|---|---|---|
| Select Disable | — | — |
| Select Enable | Select one from among One Earbud, One Earbud (Overlap), Both Earbuds, and Both Earbuds (Overlap) | Select one or more from among Airport info Channel, Museum Channel, Department Channel . . . |

Based on the user's selection based on the first UI and the second UI of Table 1, five cases as shown in Table 2 below may occur. According to various embodiments, in the second to fifth cases of Table 2, one or more broadcast channels selected by the user based on the third UI may be considered.

TABLE 2

| First case | Select Disable |
|---|---|
| Second case | Select Enable + One Earbud |
| Third case | Select Enable + One Earbud (Overlap) |
| Fourth case | Select Enable + Both Earbuds |
| Fifth case | Select Enable + Both Earbuds (Overlap) |

Hereinafter, operations of the electronic device 401 for each of the first to fifth cases as shown in Table 2 are described.

FIG. 9 is a flowchart 900 illustrating operations of an electronic device 401 in the first case according to various embodiments.

According to various embodiments, the operations shown in FIG. 9 are not limited to the shown order but may rather be performed in other various orders. According to various embodiments, more or less operations than those of FIG. 9 may be performed.

Referring to FIG. 9, in operation 902, the electronic device 401 may identify that "Disable" is selected in the first UI. According to an embodiment, when "Disable" is selected in the first UI, the electronic device 401 may identify that the user has selected not to use the BIS service.

In operation 904, the electronic device 401 may set the priority of the BIS service to have a lower priority than the CIS service, for the first earbud device 502 and the second earbud device 504.

In operation 906, the electronic device 401 may transmit first data for a CIS service to the first earbud device 502 and the second earbud device 504.

In operation 908, the electronic device 401 may not perform scan (or monitoring) on the second data for the BIS service or, although the second data is scanned, disregard it while transmitting the first data to the first earbud device 502 and the second earbud device 504. For example, the electronic device 401 may not regard the second data as data to be provided to the first earbud device 502 and the second earbud device 504 although the second data on the broadcast channel is scanned based on the BIS service being set to be lower in priority than the CIS service. In other words, the electronic device 401, based on the user's selection, may bypass sending the second data to the first earbud device 502 and/or the second earbud device 504 upon receiving the second data. The second data is received via a BIS service.

According to an embodiment, when the CIS service is an audio streaming service, and the BIS service is an airport announcement service, the electronic device 401 may transmit audio data to the first earbud device 502 and the second earbud device 504 but may not transmit the airport announcement data. Accordingly, the user may listen to audio data-based music through the first earbud device 502 and the second earbud device 504 without disturbance by the airport announcement.

FIG. 10 is a view 1000 illustrating a data flow to an ear-wearable device in a first case according to various embodiments.

According to various embodiments, in the first case, e.g., when the user selects not to use the BIS service, data transmission/reception using the CIS and CIG may be performed between the electronic device 401 and the first earbud device 502, and data transmission/reception using the CIS and CIG may be performed between the electronic device 401 and the second earbud device 504.

Referring to FIG. 10, events for CISs included in one CIG may be divided in packet units. For example, the events for CISs may include Event X 1002, which is an event associated with an $X^{th}$ packet, Event X+1 1004, which is an event associated with an $X+1^{th}$ packet, Event X+2 1006, which is an event associated with an $X+2^{th}$ packet, and Event X+3 1008, which is an event associated with an $X+3^{th}$ packet. Each packet may include one whole data or a protocol data unit (PDU) generated by dividing one data.

According to an embodiment, Event X 1002, Event X+1 1004, Event X+2 1006, and Event X+3 1008 each may occur at an ISO interval (e.g., 5 ms to 4 s). Event X 1002, Event X+1 1004, Event X+2 1006, and Event X+3 1008 each may include a plurality of subevents (e.g., Subevent 1 and Subevent 2). According to an embodiment, Subevent 1 may be a subevent related to the first earbud device 502, and Subevent 2 may be a subevent related to the second earbud device 504.

During Subevent 1 of Event X 1002, the electronic device 401 may transmit the $X^{th}$ packet to the first earbud device 502 using the first CIS (e.g., the first CIS 306 of FIG. 3A) and may receive a response signal (e.g., Ack or Nack) indicating whether the $X^{th}$ packet is received by the first earbud device 502. Subevent 1 of Event X 1002 may be performed through an ISO channel (X, 1).

During Subevent 2 of Event X 1002, the electronic device 401 may transmit the $X^{th}$ packet to the second earbud device 504 using the second CIS (e.g., the second CIS 308 of FIG. 3A) and may receive a response signal (e.g., Ack or Nack) indicating whether the $X^{th}$ packet is received by the second earbud device 504. Subevent 2 of Event X 1002 may be performed through an ISO channel (X, 2).

During Subevent 1 of Event X+1 1004, the electronic device 401 may transmit an $X+1^{th}$ packet to the first earbud device 502 using the first CIS and may receive a response signal (e.g., Ack or Nack) indicating whether the $X+1^{th}$ packet is received from the first earbud device 502. Subevent 1 of Event X+1 1004 may be performed through an ISO channel (X+1, 1).

During Subevent 2 of Event X+1 1004, the electronic device 401 may transmit the X+1$^{th}$ packet to the second earbud device 504 using the second CIS and may receive a response signal (e.g., Ack or Nack) indicating whether the X+1$^{th}$ packet is received from the second earbud device 504. Subevent 2 of Event X+1 1004 may be performed through an ISO channel (X+1, 2).

According to an embodiment, after Event X+1 1004, the second data broadcast for the BIS service may be scanned. Since the priority of the BIS service is lower than that of the CIS service, the second data may be disregarded, and the following operation for the CIS service may continue.

During Subevent 1 of Event X+2 1006, the electronic device 401 may transmit an X+2$^{th}$ packet to the first earbud device 502 using the first CIS and may receive a response signal (e.g., Ack or Nack) indicating whether the X+2$^{th}$ packet is received by the first earbud device 502. Subevent+2 of Event X+1 1006 may be performed through an ISO channel (X+2, 1).

During Subevent 2 of Event X+2 1006, the electronic device 401 may transmit the X+2$^{th}$ packet to the second earbud device 504 using the second CIS and may receive a response signal (e.g., Ack or Nack) indicating whether the X+2$^{th}$ packet is received by the second earbud device 504. Subevent 1 of Event X+2 1006 may be performed through an ISO channel (X+2, 2).

During Subevent 1 of Event X+3 1008, the electronic device 401 may transmit an X+3$^{th}$ packet to the first earbud device 502 using the first CIS and may receive a response signal (e.g., Ack or Nack) indicating whether the X+3$^{th}$ packet is received by the first earbud device 502. Subevent 1 of Event X+3 1008 may be performed through an ISO channel (X+3, 1).

During Subevent 2 of Event X+3 1008, the electronic device 401 may transmit the X+3$^{th}$ packet to the second earbud device 504 using the second CIS and may receive a response signal (e.g., Ack or Nack) indicating whether the X+3$^{th}$ packet is received by the second earbud device 504. Subevent 2 of Event X+3 1008 may be performed through an ISO channel (X+3, 2).

According to an embodiment, a scan operation for the second data on the broadcast channel may be stopped/bypassed while the CIS service is provided. In this case, the electronic device 401 may perform the operations of Event X+2 1006 and Event X+3 1008 without scanning the second data.

FIG. 11 is a flowchart 1100 illustrating operations of an electronic device 401 in the second case according to various embodiments.

According to various embodiments, in the second case, the user selects to use the BIS service and selects either earbud for the BIS service.

According to various embodiments, the operations shown in FIG. 11 are not limited to the shown order but may rather be performed in other various orders. According to various embodiments, more or less operations than those of FIG. 11 may be performed.

Referring to FIG. 11, in operation 1102, the electronic device 401 may identify that "Enable" is selected in the first UI. According to an embodiment, when "Enable" is selected in the first UI (FIG. 8a), the electronic device 401 may identify that the user has selected to use the BIS service.

In operation 1104, the electronic device 401 may identify that "One Earbud" is selected in the second UI (FIG. 8b). In an embodiment, when "One Earbud" is selected, the user may identify that one of the first earbud device 502 and the second earbud device 504 will be used for the BIS service. According to an embodiment, "One Earbud" may indicate one earbud device selected from among the first earbud device 502 and the second earbud device 504.

In operation 1106, the electronic device 401 may set the priority of the BIS service to have a higher priority than the CIS service for the earbud device selected from among the first earbud device 502 and the second earbud device 504 and may set the priority of the BIS service to have a lower priority than the CIS service for the non-selected earbud devices.

In operation 1108, the electronic device 401 may monitor whether the second data for the BIS service is received on one or more broadcast channels selected based on the third UI while transmitting the first data for the CIS service to the first earbud device 502 and the second earbud device 504.

In operation 1110, if the second data is not received as a result of the monitoring, the electronic device 401 may continue to monitor whether the second data is received while transmitting the first data for the CIS service to the first earbud device 502 and the second earbud device 504. For example, the electronic device 401 may perform operation 1108 again. According to an embodiment, the operation of monitoring whether the second data is received may be performed in real-time or during a set time according to a monitoring period. According to an embodiment, when the monitoring period is not reached, the electronic device 401 may skip the operation of monitoring whether the second data is received and transmit the first data for the CIS service to the first earbud device 502 and the second earbud device 504.

If the second data is received as a result of the monitoring in operation 1110, the electronic device 401 may stop transmission of the first data to the selected earbud device and transmit the second data to the selected earbud device while transmitting the first data to the non-selected earbud device, based on the set priority in operation 1112. For example, the electronic device 401 may allow the BIS service, which is higher in priority than the CIS service, to first be processed in the selected earbud device (e.g., left earbud device) and allow the CIS service, which is higher in priority than the BIS service, to first be processed in the non-selected earbud device (e.g., right earbud device). As a result, the BIS service may not be provided to the non-selected earbud device.

According to an embodiment, when the transmission of the second data to the selected earbud device is completed, the electronic device 401 may retransmit the first data to the selected earbud device (and continue transmitting to the non-selected earbud device). Accordingly, the selected earbud device may receive the BIS service while using the CIS service and, if the BIS service is completed, may continue to use the CIS service. The user may use the BIS service (e.g., an airport announcement service) through either earbud device (e.g., the left or right earbud device) while using the CIS service (e.g., an audio streaming service). For example, the user may listen to music seamlessly through either earbud device while listening to an airport announcement through the other earbud device.

FIG. 12 is a view 1200 illustrating a data flow to an ear-wearable device in a second case according to various embodiments.

According to various embodiments, in the second case, e.g., when the user selects to use the BIS service and selects one earbud for the BIS service, data transmission/reception using the CIS and CIG and BIS and BIG may be performed for the earbud device selected from among the first earbud device 502 and the second earbud device 504, and data transmission/reception using the CIS and CIG may be performed for the non-selected earbud device.

Referring to FIG. 12, the electronic device 401 may scan second data that is broadcast data while providing a CIS service to the first earbud device 502 and the second earbud device 504. For example, the electronic device 401 may scan the second data on the broadcast channel while transmitting the first data for the CIS service during two ISO intervals corresponding to Event X 1202 and Event X+1 1204.

According to an embodiment, Event X 1202 and Event X+1 1204 are events for CISs included in one CIG and each may include a plurality of subevents (e.g., Subevent 1 and Subevent 2). According to an embodiment, Subevent 1 may be a subevent related to the first earbud device 502, and Subevent 2 may be a subevent related to the second earbud device 504.

During Subevent 1 of Event X 1202, the electronic device 401 may transmit the $X^{th}$ packet to the first earbud device 502 using the first CIS (e.g., the first CIS 306 of FIG. 3A) and may receive a response signal (e.g., Ack or Nack) indicating whether the $X^{th}$ packet is received by the first earbud device 502. Subevent 1 of Event X 1202 may be performed through an ISO channel (X, 1).

During Subevent 2 of Event X 1202, the electronic device 401 may transmit the $X^{th}$ packet to the second earbud device 504 using the second CIS (e.g., the second CIS 308 of FIG. 3A) and may receive a response signal (e.g., Ack or Nack) indicating whether the $X^{th}$ packet is received by the second earbud device 504. Subevent 2 of Event X 1202 may be performed through an ISO channel (X, 2).

During Subevent 1 of Event X+1 1204, the electronic device 401 may transmit an $X+1^{th}$ packet to the first earbud device 502 using the first CIS, and the first earbud device 502 may transmit, to the electronic device 401, a response signal (e.g., Ack or Nack) indicating whether the $X+1^{th}$ packet is received. Subevent 1 of Event X+1 1204 may be performed through an ISO channel (X+1, 1).

During Subevent 2 of Event X+1 1204, the electronic device 401 may transmit the $X+1^{th}$ packet to the second earbud device 504 using the second CIS, and the second earbud device 504 may transmit, to the electronic device 401, a response signal (e.g., Ack or Nack) indicating whether the $X+1^{th}$ packet is received. Subevent 2 of Event X+1 1204 may be performed through an ISO channel (X+1, 2).

If the second data broadcast for the BIS service is scanned after Event X+1 1204, the electronic device 401 may transmit the second data to the earbud device selected for the BIS service among the first earbud device 502 and the second earbud device 504 and may not transmit the second data to the non-selected earbud device for the BIS service. For example, when the earbud device selected for the BIS service is the second earbud device 504 (e.g., the right earbud device), and the earbud device not selected for the BIS service is the first earbud device 502 (e.g., the left earbud device), the electronic device 401 may perform the following operations.

The electronic device 401 may transmit second data in a set unit to every ISO interval, using a set number of channels, to provide a BIS service to the second earbud device 504. For example, when the second data is divided into two PDUs (e.g., a first PDU and a second PDU), the electronic device 401 may transmit the first PDU included in the second data using the BISs through a set number of channels (e.g., CH(X1', 1), CH(X', 2), CH(X', 3), and CH(X', 4)) during the ISO interval corresponding to Event X' 1210. Further, the electronic device 401 may transmit the second PDU included in the second data using the BISs through a set number of channels (e.g., CH(X'+1, 1), CH(X'+1, 2), CH(X'+1, 3), and CH(X'+1, 4)) during the ISO interval corresponding to Event X'+1 1212. In an embodiment, the set number of channels may be corresponding to the number of devices desiring to receive the second data. In an embodiment, BISs used in the set number of channels may be included in the same BIG.

According to an embodiment, the second earbud device 504 may receive the first PDU included in the second data through at least one of CH(X1', 1), CH(X', 2), CH(X', 3), and CH(X', 4) during the ISO interval corresponding to Event X' 1210. Further, the second earbud device 504 may receive the second PDU included in the second data through at least one of CH(X'+1, 1), CH(X'+1, 2), CH(X'+1, 3), and CH(X'+1, 4) during the ISO interval corresponding to Event X'+1 1212. The CIS service may be stopped while the second earbud device 504 receives the first PDU and the second PDU.

Even when the second data is received, the electronic device 401 may continuously provide the CIS service to the first earbud device 502. For example, the electronic device 401 may provide the CIS service to the first earbud device 502 during two ISO intervals corresponding to Event X+2 1206 and Event X+3 1208.

During Subevent 1 of Event X+2 1206, the electronic device 401 may transmit the $X+2^{th}$ packet to the first earbud device 502 using the second CIS and may receive a response signal (e.g., Ack or Nack) indicating whether the $X+2^{th}$ packet is received by the first earbud device 502. Subevent 1 of Event X+2 1206 may be performed through an ISO channel (X+2, 1).

According to an embodiment, during Subevent 1 of Event X+3 1208, the electronic device 401 may transmit an $X+3^{th}$ packet to the first earbud device 502 using the second CIS and may receive a response signal (e.g., Ack or Nack) indicating whether the $X+3^{th}$ packet is received from the first earbud device 502. Subevent 1 of Event X+3 1208 may be performed through an ISO channel (X+3, 1).

FIG. 13 is a flowchart 1300 illustrating operations of an electronic device 401 in the third case according to various embodiments.

According to various embodiments, the third case may represent a case in which the user selects to use the BIS service and selects either earbud for the overlap service for using the BIS service along with the CIS service.

According to various embodiments, the operations shown in FIG. 13 are not limited to the shown order but may rather be performed in other various orders. According to various embodiments, more or less operations than those of FIG. 13 may be performed.

Referring to FIG. 13, in operation 1302, the electronic device 401 may identify that "Enable" is selected in the first UI. According to an embodiment, when "Enable" is selected in the first UI, the electronic device 401 may identify that the user has selected to use the BIS service.

In operation 1304, the electronic device 401 may identify that "One Earbud (Overlap)" is selected in the second UI. In an embodiment, when "One Earbud (Overlap)" is selected, the user may identify that one of the first earbud device 502 and the second earbud device 504 will be used for the overlap service. According to an embodiment, "One Earbud (Overlap)" may indicate one earbud device selected for the overlap service from among the first earbud device 502 and the second earbud device 504.

In operation 1306, the electronic device 401 may set the priorities of the CIS service and the BIS service to be the same for the earbud device selected from among the first earbud device 502 and the second earbud device 504 and may set the priority of the BIS service to have a lower priority than the CIS service for the non-selected earbud devices.

In operation 1308, the electronic device 401 may monitor whether the second data for the BIS service is received on one or more broadcast channels selected based on the third UI while transmitting the first data for the CIS service to the first earbud device and the second earbud device.

In operation 1310, if the second data is not received as a result of the monitoring, the electronic device 401 may continue to monitor whether the second data is received while transmitting the first data for the CIS service to the first earbud device 502 and the second earbud device 504. For example, the electronic device 401 may perform operation 1308 again. According to an embodiment, the operation of monitoring whether the second data is received may be performed in real-time or during a set time according to a monitoring period. According to an embodiment, when the monitoring period is not reached, the electronic device 401 may skip the operation of monitoring whether the second data is received and transmit the first data for the CIS service to the first earbud device 502 and the second earbud device 504.

If the second data is received as a result of the monitoring in operation 1310, the electronic device 401 may transmit the first data and the second data to the selected earbud device and transmit the first data to the non-selected earbud device, based on the set priority in operation 1312. For example, the electronic device 401 may allow both the CIS service and the BIS service to be processed in the selected earbud device and allow the CIS service, which is higher in priority than the BIS service, to first be processed in the non-selected earbud device.

According to an embodiment, the first data and second data may be provided to the selected earbud device during the same time or different times, and the BIS service may not be provided to the non-selected earbud device while the CIS service is provided.

In an embodiment, the user may listen to the airport announcement along with music through the selected earbud device when the electronic device 401 transmits the first data (e.g., audio data) and the second data (e.g., airport announcement data) to the selected earbud device during the same time. Further, the user may seamlessly listen to music through the non-selected earbud device.

FIG. 14 is a view 1400 illustrating a data flow to an ear-wearable device in a third case according to various embodiments.

According to various embodiments, in the third case, i.e., when the user selects to use the BIS service and selects one earbud device for the overlap service for using the BIS service along with the CIS service, data transmission/reception using the CIS and CIG and BIS and BIG may be performed for the earbud device selected from among the first earbud device 502 and the second earbud device 504, and data transmission/reception using the CIS and CIG may be performed for the non-selected earbud device.

Referring to FIG. 14, the electronic device 401 may scan second data that is broadcast data while providing a CIS service to the first earbud device 502 and the second earbud device 504. For example, the electronic device 401 may scan the second data on the broadcast channel while transmitting the first data for the CIS service during two ISO intervals corresponding to Event X 1402 and Event X+1 1404.

According to an embodiment, Event X 1402 and Event X+1 1404 are events for CISs included in one CIG and each may include a plurality of subevents (e.g., Subevent 1 and Subevent 2). According to an embodiment, Subevent 1 may be a subevent related to the first earbud device 502, and Subevent 2 may be a subevent related to the second earbud device 504.

During Subevent 1 of Event X 1402, the electronic device 401 may transmit the $X^{th}$ packet to the first earbud device 502 using the first CIS (e.g., the first CIS 306 of FIG. 3A) and may receive a response signal (e.g., Ack or Nack) indicating whether the $X^{th}$ packet is received by the first earbud device 502. Subevent 1 of Event X 1402 may be performed through an ISO channel (X, 1).

During Subevent 2 of Event X 1402, the electronic device 401 may transmit the $X^{th}$ packet to the second earbud device 504 using the second CIS (e.g., the second CIS 308 of FIG. 3A) and may receive a response signal (e.g., Ack or Nack) indicating whether the $X^{th}$ packet is received by the second earbud device 504. Subevent 2 of Event X 1402 may be performed through an ISO channel (X, 2).

During Subevent 1 of Event X+1 1404, the electronic device 401 may transmit the $X+1^{th}$ packet to the first earbud device 502 using the first CIS, and the first earbud device 502 may transmit, to the electronic device 401, a response signal (e.g., Ack or Nack) indicating whether the $X+1^{th}$ packet is received. Subevent 1 of Event X+1 1404 may be performed through an ISO channel (X+1, 1).

During Subevent 2 of Event X+1 1404, the electronic device 401 may transmit an $X+1^{th}$ packet to the second earbud device 504 using the second CIS, and the second earbud device 504 may transmit, to the electronic device 401, a response signal (e.g., Ack or Nack) indicating whether the $X+1^{th}$ packet is received. Subevent 2 of Event X+1 1404 may be performed through an ISO channel (X+1, 2).

If the second data broadcast for the BIS service is scanned after Event X+1 1404, the electronic device 401 may transmit the second data, together with the first data, to the earbud device selected for the overlap service among the first earbud device 502 and the second earbud device 504 and may not transmit the second data to the earbud device not selected for the overlap service.

For example, when the earbud device selected for the overlap service is the second earbud device 504 (e.g., the right earbud device), and the earbud device not selected for the overlap service is the first earbud device 502 (e.g., the left earbud device), the electronic device 401 may perform the following operations.

According to an embodiment, to provide the CIS service, the electronic device 401 may transmit the $X+2^{th}$ packet to the second earbud device 504 using the first CIS during Subevent 2 of Event X+2' 1410 and receive a response signal (e.g., Ack or Nack) indicating whether the $X+2^{th}$ packet is received from the second earbud device 504. Subevent 2 of Event X+2' 1410 may be performed through an ISO channel (X+2', 2).

According to an embodiment, the electronic device 401 may transmit second data in a set unit using a set number of channels to provide the BIS service. For example, when the second data is divided into two PDUs (e.g., the first PDU and the second PDU), the electronic device 401 may transmit the first PDU included in the second data using BISs through a set number of channels (e.g., CH(X1', 1), CH(X', 2), CH(X', 3), and CH(X', 4)) during the ISO interval corresponding to Event X' 1412. In an embodiment, the set number of channels may be channels corresponding to the number of devices desiring to receive the second data. In an embodiment, BISs used in the set number of channels may be included in the same BIG. According to an embodiment, the second earbud device 504 may receive the first PDU included in the second data through at least one of CH(X1', 1), CH(X', 2), CH(X', 3), and CH(X', 4) during the ISO interval corresponding to Event X' 1412.

According to an embodiment, the ISO interval of Event X+2' 1410 during which the CIS service is provided and the ISO interval of Event X' 1412 during which the BIS service is provided may overlap in whole or part or may not overlap. When the ISO interval of Event X+2' 1410 and the ISO interval of Event X' 1412 overlap in whole or part, the CIS service and the BIS service may overlap and be provided to the second earbud device 504. Accordingly, the user may use the second data (e.g., airport announcement data) along with the first data (e.g., audio data) through the second earbud device 504. For example, the user may listen to the airport announcement provided in the BIS service while listening to music provided in the CIS service through the second earbud device 504.

Similar to the operations of the electronic device 401 for Event X+2' 1410 and Event X' 1412, the operations of the electronic device 401 for Event X+3' 1414 and Event X'+1 1414 may be performed.

According to an embodiment, the electronic device 401 may transmit the X+3$^{th}$ packet to the second earbud device 504 using the first CIS during Subevent 2 of Event X+3' 1414 to provide the CIS service and receive a response signal (e.g., Ack or Nack) indicating whether the X+3$^{th}$ packet is received by the second earbud device 504. Subevent+3 of Event X+2' 1414 may be performed through an ISO channel (X+3', 2).

According to an embodiment, the electronic device 401 may transmit second data in a set unit using a set number of channels to provide the BIS service. For example, the electronic device 401 may transmit the second PDU included in the second data using BISs through a set number of channels (e.g., CH(X1', 1), CH(X', 2), CH(X', 3), and CH(X', 4)) during the ISO interval corresponding to Event X'+1 1416. According to an embodiment, the second earbud device 504 may receive the second PDU included in the second data through at least one of CH(X1', 1), CH(X', 2), CH(X', 3), and CH(X', 4) during the ISO interval corresponding to Event X'+1 1416.

According to an embodiment, the ISO interval of Event X+3' 1414 during which the CIS service is provided and the ISO interval of Event X'+1 1416 during which the BIS service is provided may overlap in whole or part or may not overlap.

Even when the second data is received, the electronic device 401 may continuously provide the CIS service to the first earbud device 502. For example, the electronic device 401 may provide the CIS service during two ISO intervals corresponding to Event X+2 1406 and Event X+3 1408.

According to an embodiment, during Subevent 1 of Event X+2 1406, the electronic device 401 may transmit the X+2$^{th}$ packet to the first earbud device 502 using the second CIS and receive a response signal (e.g., Ack or Nack) indicating whether the X+2$^{th}$ packet is received by the first earbud device 502. Subevent+2 of Event X+1 1406 may be performed through an ISO channel (X+2, 1).

According to an embodiment, during Subevent 1 of Event X+3 1408, the electronic device 401 may transmit the X+3$^{th}$ packet to the first earbud device 502 using the second CIS and receive a response signal (e.g., Ack or Nack) indicating whether the X+3$^{th}$ packet is received by the first earbud device 502. Subevent+3 of Event X+1 1408 may be performed through an ISO channel (X+3, 1).

FIG. 15 is a flowchart 1500 illustrating operations of an electronic device 401 in the fourth case according to various embodiments.

According to various embodiments, the fourth case may represent a case in which the user selects to use the BIS service and selects both the earbuds for the BIS service.

According to various embodiments, the operations shown in FIG. 15 are not limited to the shown order but may rather be performed in other various orders. According to various embodiments, more or less operations than those of FIG. 15 may be performed.

Referring to FIG. 15, in operation 1502, the electronic device 401 may identify that "Enable" is selected in the first UI. According to an embodiment, when "Enable" is selected in the first UI, the electronic device 401 may identify that the user has selected to use the BIS service.

In operation 1504, the electronic device 401 may identify that "Both Earbud" is selected in the second UI. In an embodiment, when "Both Earbuds" is selected, the user may identify that both the first earbud device 502 and the second earbud device 504 will be used for the BIS service. According to an embodiment, "Both Earbuds" may indicate both the first earbud device 502 and the second earbud device 504.

In operation 1506, the electronic device 401 may set the priority of the BIS service to have a higher priority than the CIS service, for both the first earbud device 502 and the second earbud device 504.

In operation 1508, the electronic device 401 may monitor whether the second data for the BIS service is received on one or more broadcast channels selected based on the third UI while transmitting the first data for the CIS service to the first earbud device 502 and the second earbud device 504.

When the second data is received as a result of the monitoring in operation 1510, the electronic device 401 may stop transmitting the first data to the first earbud device 502 and the second earbud device 504 and transmit the second data to the first earbud device 502 and the second earbud device 504 based on the set priority in operation 1512. As such, the electronic device 401 may allow the BIS service, which is higher in priority than the CIS service, to first be processed for both the first earbud device 502 and the second earbud device 504.

According to an embodiment, if the transmission of the second data to the first earbud device 502 and the second earbud device 504 is completed, the electronic device 401 may retransmit the first data to the first earbud device 502 and the second earbud device 504. Accordingly, the first earbud device 502 and the second earbud device 504 may receive the BIS service while using the CIS service and, if the BIS service is completed, continue to use the CIS service. The user may use the BIS service (e.g., an announcement service) through both the earbud devices (e.g., the left and right earbud devices) while using the CIS service (e.g., an audio streaming service). For example, the user may listen to the announcement through both the earbud devices while listening to music through both the earbud devices and, if the announcement ends, continue to listen to music.

FIG. 16 is a view 1600 illustrating a data flow to an ear-wearable device in a fourth case according to various embodiments.

According to various embodiments, in the fourth case, i.e., when the user selects to use the BIS service and selects both the earbuds for the BIS service, perform data transmission/reception using the CIS and CIG and BIS and BIG for both the first earbud device 502 and the second earbud device 504.

Referring to FIG. 16, the electronic device 401 may scan second data that is broadcast data while providing a CIS service to the first earbud device 502 and the second earbud device 504. For example, the electronic device 401 may scan the second data while providing the CIS service during two ISO intervals corresponding to Event X 1602 and Event X+1 1604.

According to an embodiment, Event X 1602 and Event X+1 1604 are events for CISs included in one CIG and each may include a plurality of subevents (e.g., Subevent 1 and Subevent 2). According to an embodiment, Subevent 1 may be a subevent related to the first earbud device 502, and Subevent 2 may be a subevent related to the second earbud device 504.

During Subevent 1 of Event X 1602, the electronic device 401 may transmit the $X^{th}$ packet to the first earbud device 502 using the first CIS (e.g., the first CIS 306 of FIG. 3A) and may receive a response signal (e.g., Ack or Nack) indicating whether the $X^{th}$ packet is received from the first earbud device 502. Subevent 1 of Event X 1602 may be performed through an ISO channel (X, 1).

During Subevent 2 of Event X 1602, the electronic device 401 may transmit an $X^{th}$ packet to the second earbud device 504 using the second CIS (e.g., the second CIS 308 of FIG. 3A) and may receive a response signal (e.g., Ack or Nack) indicating whether the $X^{th}$ packet is received by the second earbud device 504. Subevent 2 of Event X 1602 may be performed through an ISO channel (X, 2).

During Subevent 1 of Event X+1 1604, the electronic device 401 may transmit an $X+1^{th}$ packet to the first earbud device 502 using the first CIS, and the first earbud device 502 may transmit, to the electronic device 401, a response signal (e.g., Ack or Nack) indicating whether the $X+1^{th}$ packet is received. Subevent 1 of Event X+1 1604 may be performed through an ISO channel (X+1, 1).

During Subevent 2 of Event X+1 1604, the electronic device 401 may transmit an $X+1^{th}$ packet to the second earbud device 504 using the second CIS, and the second earbud device 504 may transmit, to the electronic device 401, a response signal (e.g., Ack or Nack) indicating whether the $X+1^{th}$ packet is received. Subevent 2 of Event X+1 1604 may be performed through an ISO channel (X+1, 2).

If the second data broadcast for the BIS service is scanned after Event X+1 1604, the electronic device 401 may transmit the second data to both the first earbud device 502 and the second earbud device 504.

The electronic device 401 may transmit second data in a set unit to every ISO interval, using a set number of channels, to provide a BIS service to the first earbud device 502 and the second earbud device 504. For example, when the second data is divided into two PDUs (e.g., a first PDU and a second PDU), the electronic device 401 may transmit the first PDU included in the second data using the BISs through a set number of channels (e.g., CH(X1', 1), CH(X', 2), CH(X', 3), and CH(X', 4)) during the ISO interval corresponding to Event X' 1606. Further, the electronic device 401 may transmit the second PDU included in the second data using the BISs through a set number of channels (e.g., CH(X'+1, 1), CH(X'+1, 2), CH(X'+1, 3), and CH(X'+1, 4)) during the ISO interval corresponding to Event X'+1

1608. In an embodiment, the set number of channels may be channels corresponding to the number of devices desiring to receive the second data. In an embodiment, BISs used in the set number of channels may be included in the same BIG.

According to an embodiment, the first earbud device 502 and second earbud device 504 may receive the first PDU included in the second data through at least one of CH(X1', 1), CH(X', 2), CH(X', 3), and CH(X', 4) during the ISO interval corresponding to Event X' 1606. Further, the second earbud device 502 may receive the second PDU included in the second data through at least one of CH(X'+1, 1), CH(X'+1, 1), CH(X'+1, 3), and CH(X'+1, 4) during the ISO interval corresponding to Event X'+1 1608. The CIS service may be stopped while the first earbud device 502 and second earbud device 504 receive the first PDU and the second PDU.

FIG. 17 is a flowchart 1700 illustrating operations of an electronic device 401 in the fifth case according to various embodiments.

According to various embodiments, the fifth case may represent a case in which the user selects to use the BIS service and selects both the earbuds for the overlap service for using the BIS service along with the CIS service.

According to various embodiments, the operations shown in FIG. 17 are not limited to the shown order but may rather be performed in other various orders. According to various embodiments, more or less operations than those of FIG. 17 may be performed.

Referring to FIG. 17, in operation 1702, the electronic device 401 may identify that "Enable" is selected in the first UI. According to an embodiment, when "Enable" is selected in the first UI, the electronic device 401 may identify that the user has selected to use the BIS service.

In operation 1704, the electronic device 401 may identify that "Both Earbuds (Overlap)" is selected in the second UI. In an embodiment, when "Both Earbuds (Overlap)" is selected, the user may identify that both the first earbud device 502 and the second earbud device 504 will be used for the overlap service. According to an embodiment, "Both Earbuds (Overlap)" may indicate both the first earbud device 502 and the second earbud device 504, as devices for the overlap service.

In operation 1706, the electronic device 401 may set the priorities of the CIS service and the BIS service to be the same, for both the first earbud device 502 and the second earbud device 504.

In operation 1708, the electronic device 401 may monitor whether the second data for the BIS service is received on one or more broadcast channels selected based on the third UI (FIG. 8c) while transmitting the first data for the CIS service to the first earbud device 502 and the second earbud device 504.

When the second data is received as a result of the monitoring in operation 1710, the electronic device 401 may transmit the second data, along with the first data, to the first earbud device 502 and the second earbud device 504, based on the set priority in operation 1712. According to an embodiment, the electronic device 401 may transmit the first data and the second data to the first earbud device 502 and the second earbud device 504 during the same or different times.

In an embodiment, when the electronic device 401 transmits the first data (e.g., audio data) and the second data (e.g., airport announcement data) to the first earbud device 502 and the second earbud device 504 during the same time, the user may listen to the airport announcement along with music through the first earbud device 502 and the second earbud device 504.

In an embodiment, when the electronic device 401 transmits the first data (e.g., audio data) and second data (e.g., airport announcement data) to the first earbud device 502 and the second earbud device 504 during different times, the user may listen to the announcement while listening to music through the first earbud device 502 and the second earbud device 504 and, if the announcement ends, continue to listen to music.

FIG. 18 is a view 1800 illustrating a data flow to an ear-wearable device in a fifth case according to various embodiments.

According to various embodiments, in the fifth case, i.e., when the user selects to use the BIS service and selects both the earbuds for the overlap service, perform data transmission/reception using the CIS and CIG and BIS and BIG for both the first earbud device 502 and the second earbud device 504.

Referring to FIG. 18, the electronic device 401 may scan second data that is broadcast data while providing a CIS service to the first earbud device 502 and the second earbud device 504. For example, the electronic device 401 may scan the second data while providing the CIS service during two ISO intervals corresponding to Event X 1802 and Event X+1 1804.

According to an embodiment, Event X 1802 and Event X+1 1804 are events for CISs included in one CIG and each may include a plurality of subevents (e.g., Subevent 1 and Subevent 2). According to an embodiment, Subevent 1 may be a subevent related to the first earbud device 502, and Subevent 2 may be a subevent related to the second earbud device 504.

During Subevent 1 of Event X 1802, the electronic device 401 may transmit the X$^{th}$ packet to the first earbud device 502 using the first CIS (e.g., the first CIS 306 of FIG. 3A) and may receive a response signal (e.g., Ack or Nack) indicating whether the X$^{th}$ packet is received by the first earbud device 502. Subevent 1 of Event X 1802 may be performed through an ISO channel (X, 1).

During Subevent 2 of Event X 1802, the electronic device 401 may transmit an X$^{th}$ packet to the second earbud device 504 using the second CIS (e.g., the second CIS 308 of FIG. 3A) and may receive a response signal (e.g., Ack or Nack) indicating whether the X$^{th}$ packet is received by the second earbud device 504. Subevent 2 of Event X 1802 may be performed through an ISO channel (X, 2).

During Subevent 1 of Event X+1 1804, the electronic device 401 may transmit an X+1$^{th}$ packet to the first earbud device 502 using the first CIS, and the first earbud device 502 may transmit, to the electronic device 401, a response signal (e.g., Ack or Nack) indicating whether the X+1$^{th}$ packet is received. Subevent 1 of Event X+1 1804 may be performed through an ISO channel (X+1, 1).

During Subevent 2 of Event X+1 1804, the electronic device 401 may transmit an X+1$^{th}$ packet to the second earbud device 504 using the second CIS, and the second earbud device 504 may transmit, to the electronic device 401, a response signal (e.g., Ack or Nack) indicating whether the X+1$^{th}$ packet is received. Subevent 2 of Event X+1 1804 may be performed through an ISO channel (X+1, 2).

If the second data broadcast for the BIS service is scanned after Event X+1 1804, the electronic device 401 may transmit the second data, along with the first data, to both the first earbud device 502 and the second earbud device 504.

According to an embodiment, to provide the CIS service, the electronic device 401 may transmit the X+2$^{th}$ packet to the first earbud device 502 using the first CIS during Subevent 1 of Event X+2 1806 and receive a response signal (e.g., Ack or Nack) indicating whether the X+2$^{th}$ packet is received by the first earbud device 502. Subevent+2 of Event X+1 1806 may be performed through an ISO channel (X+2, 1).

During Subevent 2 of Event X+2 1806, the electronic device 401 may transmit the X+2$^{th}$ packet to the second earbud device 504 using the second CIS and may receive a response signal (e.g., Ack or Nack) indicating whether the X+2$^{th}$ packet is received by the second earbud device 504. Subevent 2 of Event X+2 1806 may be performed through an ISO channel (X+2, 2).

According to an embodiment, the electronic device 401 may transmit second data in a set unit using a set number of channels to provide the BIS service. For example, when the second data is divided into two PDUs (e.g., a first PDU and a second PDU), the electronic device 401 may transmit the first PDU included in the second data using the BISs through a set number of channels (e.g., CH(X1', 1), CH(X', 2), CH(X', 3), and CH(X', 4)) during the ISO interval corresponding to Event X' 1808. In an embodiment, the set number of channels may be channels corresponding to the number of devices desiring to receive the second data. In an embodiment, BISs used in the set number of channels may be included in the same BIG.

According to an embodiment, the second earbud device 504 may receive the first PDU included in the second data through one of CH(X1', 1), CH(X', 1), CH(X', 3), and CH(X', 4) during the ISO interval corresponding to Event X' 1808. According to an embodiment, the second earbud device 504 may receive the first PDU included in the second data through another one of CH(X1', 1), CH(X', 2), CH(X', 3), and CH(X', 4) during the ISO interval corresponding to Event X' 1808.

According to an embodiment, the ISO interval of Event X+2 1806 during which the CIS service is provided and the ISO interval of Event X' 1808 during which the BIS service is provided may overlap in whole or part or may not overlap. When the ISO interval of Event X+2 1806 and the ISO interval of Event X' 1808 overlap in whole or part, the CIS service and the BIS service may overlap and be provided to the first earbud device 502 and the second earbud device 504. Accordingly, the user may use the second data (e.g., airport announcement data) along with the first data (e.g., audio data) through the first earbud device 502 and the second earbud device 504. For example, the user may listen to the airport announcement provided in the BIS service while listening to music provided in the CIS service through the first earbud device 502 and second earbud device 504.

Similar to the operations of the electronic device 401 for Event X+2 1806 and Event X' 1808, the operations of the electronic device 401 for Event X+3 1810 and Event X'+1 1812 may be performed.

According to an embodiment, the electronic device 401 may transmit the X+3$^{th}$ packet to the first earbud device 502 using the first CIS during Subevent 1 of Event X+3 1810 to provide the CIS service and receive a response signal (e.g., Ack or Nack) indicating whether the X+3$^{th}$ packet is received by the first earbud device 502. Subevent 1 of Event X+3 1810 may be performed through an ISO channel (X+2, 1).

To provide the CIS service, the electronic device 401 may transmit the X+3$^{th}$ packet to the second earbud device 504 using the second CIS during Subevent 2 of Event X+3 1810 and receive a response signal (e.g., Ack or Nack) indicating whether the X+3$^{th}$ packet is received by the second earbud device 504. Subevent 2 of Event X+3 1810 may be performed through an ISO channel (X+2, 2).

According to an embodiment, the electronic device 401 may transmit second data in a set unit using a set number of channels to provide the BIS service. For example, the electronic device 401 may transmit the second PDU included in the second data using BISs through a set number of channels (e.g., CH(X1', 1), CH(X', 2), CH(X', 3), and CH(X', 4)) during the ISO interval corresponding to Event X'+1 1812.

According to an embodiment, the first earbud device 502 may receive the second PDU included in the second data through one of CH(X1', 1), CH(X', 2), CH(X', 3), and CH(X', 4) during the ISO interval corresponding to Event X'+1 1812. According to an embodiment, the second earbud device 504 may receive the second PDU included in the second data through another one of CH(X1', 1), CH(X', 2), CH(X', 3), and CH(X', 4) during the ISO interval corresponding to Event X'+1 1812.

According to an embodiment, the ISO interval of Event X+3 1810 during which the CIS service is provided and the ISO interval of Event X'+1 1812 during which the BIS service is provided may overlap in whole or part or may not overlap.

According to various embodiments, broadcast data using a plurality of BISs and BIGs may be scanned. In this case, the electronic device 401 may set different priorities for a plurality of BISs and BIGs based on the user's selection and transmit broadcast data using the plurality of BISs and BIGs to at least one of the first earbud device 502 and the second earbud device 504 sequentially or simultaneously based on the set priorities. According to various embodiments, the electronic device 401 may transmit broadcast data using the plurality of BISs and BIGs sequentially in order of scan during a set time.

According to various embodiments, a method for transmitting data by an electronic device (e.g., the electronic device 101 of FIG. 1, the electronic device 201 of FIG. 2, the electronic device 301 of FIG. 3A, the electronic device 311 of FIG. 3B, or the electronic device 401 of FIG. 4) may comprise transmitting (e.g., operation 602 of FIG. 6) first data to each of at least two external electronic devices (e.g., the electronic device 102 or electronic device 104 of FIG. 1, the first earbud device 202 and second earbud device 204 of FIG. 2, the first earbud device 302 and second earbud device 304 of FIG. 3A, the first earbud device 312 and second earbud device 314 of FIG. 3B or the third earbud device 316 and fourth earbud device 318 and the first earbud device 502 and the second earbud device 504 of FIG. 3B) through at least two communication links. The method further includes monitoring (e.g., operation 604 of FIG. 6) whether second data, which is broadcast data, is received while transmitting the first data. The method further includes transmitting (e.g., operation 604 of FIG. 6) the second data, instead of the first data, to at least one of the at least two external electronic devices based on a set condition in case that reception of the second data is identified based on a result of the monitoring.

According to an embodiment, the set condition may include a condition set based on at least one of a) whether it is determined that at least one of the at least two external electronic devices is to receive the second data, b) whether at least one external electronic device for receiving the second data is selected from among the at least two external electronic devices, and c) whether the second data is data of a configured broadcast channel.

According to an embodiment, transmitting the second data may comprise, based on determining (e.g., operation

1102 of FIG. 11) that at least one of the at least two external electronic devices is to receive the second data, selecting a first external electronic device among the at least two external electronic devices (e.g., operation 1104 of FIG. 11) as a device for receiving the second data. Based on determining that the second data is data of a configured broadcast channel, (e.g., operation 1112 of FIG. 11) the second data is transmitted, instead of the first data, to the first external electronic device. Further, transmitting the second data further includes transmitting the first data to at least one second external electronic device except for the first external electronic device among the at least two external electronic devices.

According to an embodiment, transmitting the second data may comprise, based on determining (e.g., operation 1302 of FIG. 13) that at least one of the at least two external electronic devices is to receive the second data, selecting a first external electronic device among the at least two external electronic devices (e.g., operation 1304 of FIG. 13) as a device for receiving the first data and the second data. Further, in case the second data is data of a configured broadcast channel, the first data and the second data is transmitted to the first external electronic device. Further, transmitting the second data includes transmitting (e.g., operation 1312 of FIG. 13) the first data to at least one second external electronic device except for the first external electronic device among the at least two external electronic devices.

According to an embodiment, transmitting the first data and the second data to the first external electronic device may comprise transmitting the first data and the second data to the first external electronic device during a same time or different times.

According to an embodiment, transmitting the second data may comprise, based on determining (e.g., operation 1502 of FIG. 15) that at least one of the at least two external electronic devices is to receive the second data, the at least two external electronic devices are selected (e.g., operation 1504 of FIG. 15) as devices for receiving the second data, and the second data is data of a configured broadcast channel, transmitting (e.g., operation 1512 of FIG. 15) the second data, instead of the first data, to the at least two external electronic devices.

According to an embodiment, transmitting the second data may comprise, based on determining (e.g., operation 1702 of FIG. 17) that at least one of the at least two external electronic devices is to receive the second data, selecting the at least two external electronic devices (e.g., operation 1704 of FIG. 17) as devices for receiving the first data and the second data. Further, in case the second data is data of a configured broadcast channel, (e.g., operation 1712 of FIG. 15) the first data and the second data are transmitted to the at least two external electronic devices.

According to an embodiment, transmitting the first data and the second data to the at least two external electronic devices may comprise transmitting the first data and the second data to the at least two external electronic devices during a same time or different times.

According to an embodiment, transmitting the second data may comprise, based on determining (e.g., operation 902 of FIG. 9) that at least one of the at least two external electronic devices is not to receive the second data, stopping monitoring whether the second data is received or transmitting the first data to at least one of the at least two external electronic devices although the second data is received (e.g., operation 908 of FIG. 9).

According to an embodiment, the method may further comprise, in response to completion of the transmission of the second data, retransmitting the first data.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a memory;
   a communication circuit configured to perform communication with at least two external electronic devices through at least two communication links; and
   at least one processor operatively connected with the memory and the communication circuit,
   wherein the memory stores instructions configured to, when executed by the at least one processor individually or collectively, cause the electronic device to:
   transmit first data to each of the at least two external electronic devices through the at least two communication links, wherein the first data is transmitted via a connected isochronous stream (CIS), wherein the at least two external electronic devices comprise at least a first external electronic device and a second external electronic device,
   receive second data, which is broadcast data received via a broadcast isochronous stream (BIS), while transmitting the first data to the first external electronic device and the second external electronic device, wherein the second data is data of a configured broadcast channel,
   determine that a setting is preset for the first external electronic device to receive the second data, and
   based on determining that the setting is preset for the first external electronic device to receive the second data, transmit the second data, instead of the first data, to the first external electronic device, and transmit the first data to the second external electronic device.

2. The electronic device of claim 1, wherein:

based on determining that the first external electronic device being selected for receiving the second data, transmit the second data, instead of the first data, to the first external electronic device and transmit the first data the second external electronic device.

3. The electronic device of claim 1, wherein the instructions cause the electronic device to based on determining that the first external electronic device being selected as a device for receiving the first data and the second data, transmit the first data and the second data to the first external electronic device and transmit the first data to the second external electronic device.

4. The electronic device of claim 3, wherein the instructions cause the electronic device to transmit the first data and the second data to the first external electronic device during a same time.

5. The electronic device of claim 1, wherein the instructions cause the electronic device to, based on determining that the at least two external electronic devices are selected as devices for receiving the second data, transmit the second data, instead of the first data, to the at least two external electronic devices.

6. The electronic device of claim 1, wherein the instructions cause the electronic device to:

based on determining that the at least two external electronic devices are selected as devices for receiving the first data and the second data transmit the first data and the second data to the at least two external electronic devices.

7. The electronic device of claim 6, wherein the instructions cause the electronic device to transmit the first data and the second data to the at least two external electronic devices during a same time.

8. The electronic device of claim 1, wherein the instructions cause the electronic device to based on determining that at least one of the at least two external electronic devices is not to receive the second data, stop monitoring whether the second data is received or transmit the first data to at least one of the at least two external electronic devices although the second data is received.

9. The electronic device of claim 1, wherein the instructions cause the electronic device to in response to completion of the transmission of the second data, retransmit the first data.

10. The electronic device of claim 1, wherein the instructions cause the electronic device to monitor for the second data over one or more broadcast channels.

11. The electronic device of claim 1, wherein the CIS is a data transport stream for point-to-point communication and the BIS is a broadcast data transport stream.

12. A method for transmitting data by an electronic device, the method comprising:

transmitting first data to each of at least two external electronic devices through at least two communication links, the first data comprising audio data, wherein the first data is transmitted via a connected isochronous stream (CIS), wherein the at least two external electronic devices comprise at least a first external electronic device and a second external electronic device;

receiving second data, which is broadcast data received via a broadcast isochronous stream (BIS), while transmitting the first data to the first external electronic device and the second external electronic device, wherein the second data is data of a configured broadcast channel;

determining that a setting is preset for the first external electronic device to receive the second data; and based on determining that the setting is preset for the first external electronic device to receive the second data, transmitting the second data, instead of the first data, to the first external electronic device.

13. The method of claim 12, wherein transmitting the second data comprises:

based on determining that the first external electronic device being selected for receiving the second data, transmitting the second data, instead of the first data, to the first external electronic device and transmit the first data to the second external electronic devices; and based on determining that the first external electronic device being selected as a device for receiving the first data and the second data, transmitting the first data and the second data to the first external electronic device and transmitting the first data to the second external electronic device.

14. The method of claim 13, wherein transmitting the first data and the second data to the first external electronic device comprises:

transmitting the first data and the second data to the first external electronic device during a same time.

15. The method of claim 12, wherein transmitting the second data comprises:

based on determining that the at least two external electronic devices are selected as devices for receiving the second data, transmitting the second data, instead of the first data, to the at least two external electronic devices.

16. The method of claim 12, wherein transmitting the second data comprises:

based on determining that the at least two external electronic devices are selected as devices for receiving the first data and the second data, transmitting the first data and the second data to the at least two external electronic devices.

17. The method of claim 16, wherein transmitting the first data and the second data to the at least two external electronic devices comprises:

transmitting the first data and the second data to the at least two external electronic devices during a same time.

18. The method of claim 12, wherein transmitting the second data comprises:

based on determining that at least one of the at least two external electronic devices is not to receive the second data, stopping monitoring whether the second data is received or transmitting the first data to at least one of the at least two external electronic devices although the second data is received.

19. The method of claim 12, further comprising:

in response to completion of the transmission of the second data, retransmitting the first data.

20. The method of claim 12, wherein the CIS is a data transport stream for point-to-point communication and the BIS is a broadcast data transport stream.

* * * * *